United States Patent [19]
Uratani et al.

[11] Patent Number: 5,737,207
[45] Date of Patent: Apr. 7, 1998

[54] POWER SUPPLY

[75] Inventors: Kazuyuki Uratani, Tokyo; Noriyuki Kitamura, Kanagawa; Tsutomu Kakitani, Yokosuka; Yuji Takahashi, Yokosuka; Keiichi Shimizu, Yokosuka; Kazutoshi Mita, Yokosuka, all of Japan

[73] Assignee: Toshiba Lighting and Technology Corporation, Tokyo, Japan

[21] Appl. No.: 624,319

[22] Filed: Mar. 28, 1996

[30] Foreign Application Priority Data

| Mar. 29, 1995 | [JP] | Japan | 7-071532 |
| Mar. 29, 1995 | [JP] | Japan | 7-072169 |
| Mar. 30, 1995 | [JP] | Japan | 7-074043 |
| Mar. 31, 1995 | [JP] | Japan | 7-076939 |
| Mar. 31, 1995 | [JP] | Japan | 7-076959 |
| Sep. 29, 1995 | [JP] | Japan | 7-254334 |
| Sep. 29, 1995 | [JP] | Japan | 7-254343 |
| Mar. 11, 1996 | [JP] | Japan | 8-053563 |

[51] Int. Cl.[6] ................................. H02M 7/537
[52] U.S. Cl. ................................. 363/132; 363/37
[58] Field of Search .................. 363/15, 17, 24, 363/25, 26, 37, 98, 132; 315/291

[56] References Cited

U.S. PATENT DOCUMENTS

| 4,564,897 | 1/1986 | Okamoto et al. | 363/132 |
| 5,175,474 | 12/1992 | Kakitani et al. | 315/291 X |
| 5,303,140 | 4/1994 | Shimizu | 363/132 |
| 5,475,580 | 12/1995 | Noro | 363/24 |

*Primary Examiner*—Peter S. Wong
*Assistant Examiner*—Y. J. Han
*Attorney, Agent, or Firm*—Cushman Darby & Cushman IP Group of Pillsbury Madison & Sutro LLP

[57] ABSTRACT

A power supply apparatus has a rectifier for outputting a non-smoothed DC. A switching circuit alternately shut off output of the rectifier at a high frequency, which includes first and second switches. A first capacitor couples to the first and second switches for smoothing output of the rectifier. A series resonance circuit includes a second capacitor and an inductor so that the voltage across the first capacitor becomes lower by the resonance voltage than that of the output of the rectifier. The switches are coupled to a feedback circuit including a saturatable current transformer having a primary winding and secondary winding. A control means varies the saturation time of the saturatable current transformer.

56 Claims, 18 Drawing Sheets

| Harmonics degree (n) | Relative harmonics noise (%) | Reference Values (%) |
|---|---|---|
| 2 | 0.0 | 2 |
| 3 | 2.9 | $30 \times \lambda \text{(Power factor)}$ |
| 5 | 6.1 | 10 |
| 7 | 3.3 | 7 |
| 9 | 2.0 | 5 |
| $11 \leqq n \leqq 39$ | 1.3 or less | 3 |

FIG.7

Capacitance of first variable impedance circuit

Capacitance of first variable impedance circuit

Capacitance of first variable impedance circuit

FIG.20(a) $I_{in}$ 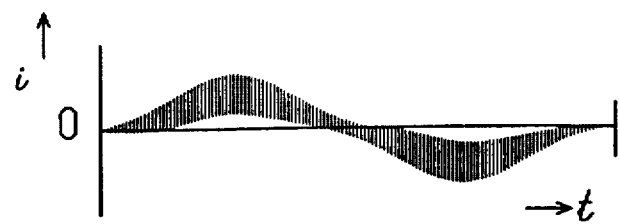
FIG.20(b) $V_{dc}$ 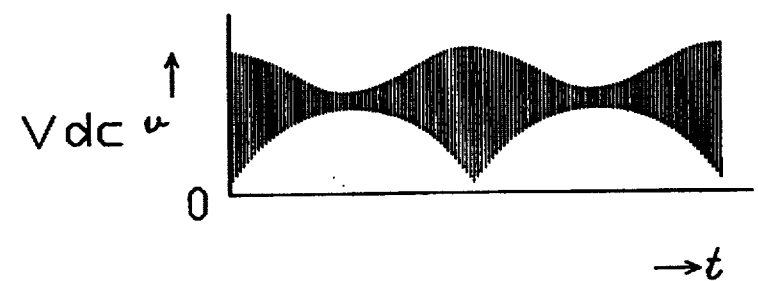
FIG.20(c) $I_{FL}$ 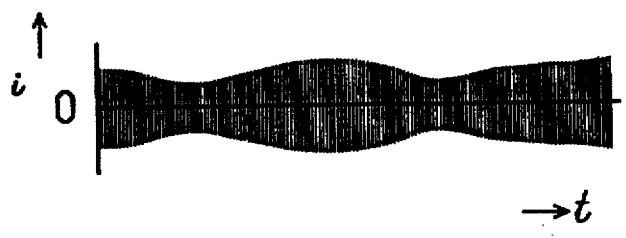

POWER SUPPLY

BACKGROUND OF THE INVENTION

1. Field of the Invention

The present invention relates to a power supply apparatus having a switching circuit which improves the input power factor from an AC power source and reduces the distortion of an input current. More particularly, the invention provides a power supply apparatus having a feedback circuit that includes a saturatable current transformer responding to a current for controlling the switching circuit to achieve a self excitation and control of the output power.

2. Description of the Related Art

A discharge lamp, such as a fluorescent lamp, typically utilizes a power supply apparatus to convert commercial AC power to high frequency power which is impressed across a resonant circuit including a resonant inductor and a resonant capacitor. The power supply apparatus includes a series half-bridge inverter having a pair of switches that alternately connect one end of the resonant circuit to a DC voltage and then to a ground, thereby impressing the high frequency power across the resonant circuit.

A known power supply apparatus is shown in FIG. 16 (Prior Art). This power supply apparatus was disclosed in Japanese Laid Open Patent Application No. 5-174986. It's design arrangement represented an attempt to improve the input power factor. The arrangement includes a half-bridge inverter circuit 1601 comprising two series-connected switches 1602, 1603 connected to a full-wave rectifier 1604 for rectifying AC power source 1605. An inductor 1606 and a capacitor 1607 are arranged on the input side of the full-wave rectifier 1604. A smoothing capacitor 1608 is arranged on the output side of full-wave rectifier 1604. A series lead circuit, which includes an inductance 1609, a discharge lamp 1610, such as, for example, a fluorescent lamp, and a capacitor 1611, blocking direct current flow, is connected to switches 1602, 1603. Although the operation of inverter circuit 1601 is not explained in detail in the publication, it would appear to operate as follows. Inductor 1606 and capacitor 1607 generate a resonance voltage synchronized with the switching period of switch 1602. In the period of switch 1602, power is first supplied from capacitor 1608 to inverter circuit 1601, but a voltage drop occurs because capacitor 1608 has a small capacitance. Thereafter, a current flows from AC power source 1605 into inverter circuit 1601. When switch 1602 turns off, the flow of current is cut off, and the resonance voltage generates. When the circuit constant defined by inductor 1606 and capacitor 1607 is set so as to be within a predetermined range, the resonance voltage becomes higher than the voltage across smoothing capacitor 1608. Therefore, current flows into capacitor 1608 because the resonance voltage serves as a power source. With this operation, an input current flows even during a period in which the input AC voltage is low, thereby improving an input power factor and an input current distortion. However, it is difficult to perform a sufficient smoothing operation or attain a sufficient reduction in input current distortion. This is because current flowing from AC power source 1605 into inverter circuit 1601 is zero or very small near a zero-crossing point of AC power source 1605, and a high resonance voltage cannot be obtained. More specifically, when a sufficient smoothing operation is to be performed by the capacitor 1608, no input current can be supplied near a zero-crossing point of AC power source 1605, and a high resonance voltage cannot be obtained. During this period, an input current cannot be supplied from AC power source 1605. Therefore, a sufficient reduction in input current distortion cannot be attained.

Another known arrangement is shown in FIG. 17 (Prior Art). This arrangement is disclosed in Japanese Laid Open Patent Application No. 2-75200. AC power is supplied through a high frequency blocking device 1704 to a rectifier 1703. A pair of switches 1701, 1702 is arranged across rectifier 1703. Diodes 1705, 1706 are connected in parallel with switches 1701, 1702 for supplying currents in opposite directions. Two series-connected capacitors 1707, 1708 are connected in parallel with switches 1701, 1702. The capacitance of one capacitor 1708 is set to be larger than that of the other capacitor 1707. A diode 1709 is connected in parallel with capacitor 1707. A series circuit of an inductor 1710 and a discharge lamp 1711, such as, for example, a fluorescent lamp, is connected between the node of the pair of switches 1701, 1702 and the node of capacitors 1707, 1708. In addition, a capacitor 1712 is connected between ends of the filaments of the lamp 1711. According to this application, in the ON period of switch 1701, a current is supplied to inductor 1710 and lamp 1711 through switch 1701 from rectifier 1703, and capacitor 1708 is charged. In the interval between the instant at which switch 1701 is turned off and the instant at which the other switch 1702 is turned on, a current is supplied to capacitor 1708 and diode 1706 by the energy stored in inductor 1710. When switch 1702 is turned on, capacitor 1708 discharges through switch 1702, inductor 1710 and lamp 1711. In the subsequent interval between the instant at which switch 1702 is turned off and the instant at which the other switch 1701 is turned on, a current is supplied to capacitor 1707 and diode 1705 by the energy stored in inductor 1710. In this manner, a high-frequency AC current flows to lamp 1711. Furthermore, in the ON period of switch 1701, a current flows to charge large capacitor 1708 so as to make the input current approach a sine wave. According to this application, during a period in which the peak value of an output voltage from rectifier 1703 (a period in which the pulsating output voltage from rectifier 1703 is zero or near zero), no input current can be supplied. During this period, capacitor 1708 discharges. Therefore, only a discharge current from capacitor 1708 together with a regenerative current generated by the energy based on this discharge current and stored in inductor 1710 flows through diode 1709. Such phenomenon occurs for the following reason. Because, the voltage across a series circuit of capacitors 1707, 1708 is larger than the output voltage of rectifier 1703, in this period. As described above, during some period, an input current cannot be supplied from power source, resulting in an insufficient reduction in input current distortion.

Another power supply arrangement is shown in FIG. 18 (Prior Art). This arrangement corresponds to Unpublished Japanese Patent Application Set. No. 7-73754 filed By the present assignee (this document may not Be "prior art"). In this apparatus, first and second switching devices 1801, 1802 are connected to each other in a series between output terminals of rectifier 1803 which rectifies AC voltage into a non-smoothed DC voltage, and alternately turn on/off the non-smoothed DC voltage at a frequency higher than that of the output voltage. Switching devices 1801, 1802 are operated by switching control means 1804. Switching control means 1804 turns on/off first and second switching devices 1801, 1802 at a substantially constant frequency. It is capable of changing the ratio of ON periods of the first and second switching devices 1801, 1802. Switching control means 1804 also controls the respective ON period of switching devices according to a peak voltage of AC power source. To detect the peak voltage, a detector 1805 is coupled to an output of rectifier 1803. For instance, switching control means 1804 shortens the ON period of first switching device 1801 when a peak value of a voltage output from AC power source every half cycle is high, and lengthens the ON period when the peak voltage is low. Switching control means 1804 lengthens and shortens the ON period of second switching device 1802 when the output voltage of AC power source is high and low, respectively. A smoothing capacitor 1806 is connected in parallel with second switching device 1802. An inductor 1807-1, which is a primary winding of transformer 1807, is connected between first switching device 1801 and capacitor 1806. A second capacitor 1808 is arranged so as to cooperate with winding 1807-1 to form a resonance circuit according to the ON/OFF operations of first and second switching devices 1801, 1802. A high-frequency resonance output, which is caused by winding 1807-1 and second capacitor 1808, is obtained with secondary winding 1807-2 of transformer 1807.

As each ON period of switching devices 1801, 1802 is controlled by switching control means 1804, sufficient smoothing is achieved to attain a significant reduction in input current distortion. This is because the apparatus has a different circuit operation from prior apparatus. The circuit operation will be described in detail next with reference to FIGS. 19(a) to 19(e). Those FIGURES schematically show only the essential elements needed to explain the circuit operation, which indicate current paths in each state of switching devices 1801, 1802.

A duration in which the peak voltage of an AC power source (non-smoothed DC voltage) is high will be described first with reference to FIGS. 19(a) to 19(e). In this duration, switching control means 1804 controls first switching device 1801 in accordance with the detected voltage so as to set the ON period to be relatively short.

During a period (a) (FIG. 19(a)), since a closed circuit of first capacitor 1806, second switching device 1802 and winding 1807-1 is formed, the charges stored in first capacitor 1806 are discharged through the closed circuit.

During a period (b) (FIG. 19(b)), second switching device 1802 is turned off, and the parasitic diode 1801d of first switching device 1801 turns on. Therefore, winding 1807-1 and second capacitor 1808 cause series resonance. With this operation, resonance voltage appears in second capacitor 1808 and winding 1807-1. In addition, a resonance voltage appears across second capacitor 1808 and first capacitor 1806. The peak of this resonance voltage is in proportion to an energy stored in winding 1807-1, which is determined by current flow through second switching device 1802 and a voltage applied across second capacitor 1808 before second switching device 1802 is turned off.

During a period (c) (FIG. 19(c)), first switching device 1801 turns on, and the polarity of resonance current is reversed. The resonance voltages occurring during periods (b), (c) are boosted because they become higher than the output voltage of rectifier 1803.

During a period (d) (FIG. 19(d)), the resonance voltages drop, and the voltages across second capacitor 1808 and first capacitor 1806 also tend to drop. As a result, current flows from rectifier 1803 through first capacitor 1806, winding 1807-1 and first switching device 1801.

During a period (e) (FIG. 19(e)) first switching device 1801 turns off, and the parasitic diode 1802d of second switching device 1802 is turned on. Therefore, current flows through the parasitic diode 1802d of second switching device 1802 and first capacitor 1806 owing to the energy stored in winding 1807-1 during the periods (d), (e). Thereafter, such states explained above are repeated.

A duration in which the peak voltage of an AC power source is low will now be explained. In this duration, switching control means 1804 controls first switching device 1801 so that the ON period of first switching device 1801 becomes relatively long according to the peak voltage detected by detector. Although the circuit operation in this case is basically the same as in the above case, the resonance peak voltage is larger than that of above duration. This is because the charge stored in second capacitor 1808 is small when the peak voltage is low. Therefore, an initial current, which tends to flow to second capacitor 1808 to charge it, increases. Accordingly, an initial resonant current increases during the period (b). As a result, the resonance voltage can be boosted more when the peak voltage of an AC power source is low. In other words, a low voltage in a trough of non-smoothed DC voltage can be mitigated by the resonance voltages, whereby, power supply apparatus generates a constant output. More, the voltages across first and second capacitors 1806, 1808 can be lower than the voltage generated by rectifier 1803 even when the peak voltage is low, whereby an input current can be provided from rectifier 1803. As second switching device 1802 is controlled so that the ON period becomes relatively short when the peak voltage is low, a current flowing through second switching device 1802 is shut off at the rising phase of the current. As a result, although the resonance voltage is boosted more than mentioned above, the resonance voltage at the period (b) is not extremely increased, because the energy stored in winding 1807-1 is small when second switching device 1802 turns off. Accordingly, the input power factor and the distortion of the input current are improved.

As the circuit operation of power supply apparatus described above, a discharge lamp 1809, such as, for example, a fluorescent lamp, is energized by high frequency voltage generated at secondary winding 1807-2 of transformer 1807. As a current can be flowed from rectifier 1803 during the period (d), the input current Iin from AC power source has a waveform shown in FIG. 20 (a). It is, therefore, understood that this input current improves the input power factor and contributed to a reduction in the distortion of an input current.

FIG. 20(b) shows the output voltage Vdc of rectifier 1803. The white portion changing sinusoidal indicates non-smoothed DC voltage rectified by rectifier 1803, the high frequency wave piled up the white portion indicates the boosted voltage by the resonance.

As shown in FIG. 20(c), the envelope curve of the lamp current IFL has little ripple because first capacitor functions to smooth the non-smoothed DC voltage generated from rectifier 1803.

The power supply arrangement achieves sufficient smoothing and attains sufficient reduction in input current distortion. It can be controlled by the output of the apparatus by control means 1804. However, it requires an external switching control means 1804, such as a pulse width modulator, in order to control switching devices 1801, 1802 and a detector 1805 to detect an input voltage change. Therefore, it is difficult to simplify the arrangement in order to cheapen the apparatus.

SUMMARY OF THE INVENTION

Accordingly, the present invention has a primary objective of providing a power supply apparatus that can sufficiently smooth and reduce input current distortion without using an external switching control means.

Another object of the present invention is to provide a power supply apparatus that enables control of the output of the apparatus.

Accordingly, the present invention provides a power supply apparatus that has a rectifier for rectifying an AC power and outputting a non-smoothed DC power. A switching circuit is provided to alternately shut off output of the rectifier at a high frequency. The switching circuit includes first and second switching devices connected in series. A first capacitor is coupled to the first and second switching devices such that the first capacitor is supplied a charge current through the first switching device from the rectifier when the first switching device is closed and discharges through the second switching device when the second switching device is closed for smoothing output of the rectifier. A series resonance circuit is also provided. The series resonance circuit includes a second capacitor and an inductor provided at a path which flows the charge and discharge current of the first capacitor so that the voltage across the first capacitor becomes lower by the resonance voltage than that of the output of the rectifier. The switching devices are coupled to a feedback circuit. The feedback circuit includes a saturatable current transformer having a primary winding and secondary winding. The primary winding is provided at a path which at least flows the resonant current and the secondary winding is coupled to the switching devices for controlling the operation of the switching devices. A control means varies the saturation time of the saturatable current transformer. Means are provided to output the voltage generated by the series resonance circuit.

These and other objects, features and characteristics of the present invention as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The present invention will now be described in more detail by way of examples illustrated by drawings in which:

FIG. 7 is a table showing a experimental results about harmonics noise radiated by the power supply apparatus shown in FIG. 6;

FIGS. 20(a), 20(b) and 20(c) are waveforms of an input current (Iin), output voltage (Vdc) of rectifier and the lamp current (IFL) of the power supply apparatus shown in FIG. 18, respectively.

DETAILED DESCRIPTION OF THE INVENTION

Figure 1:
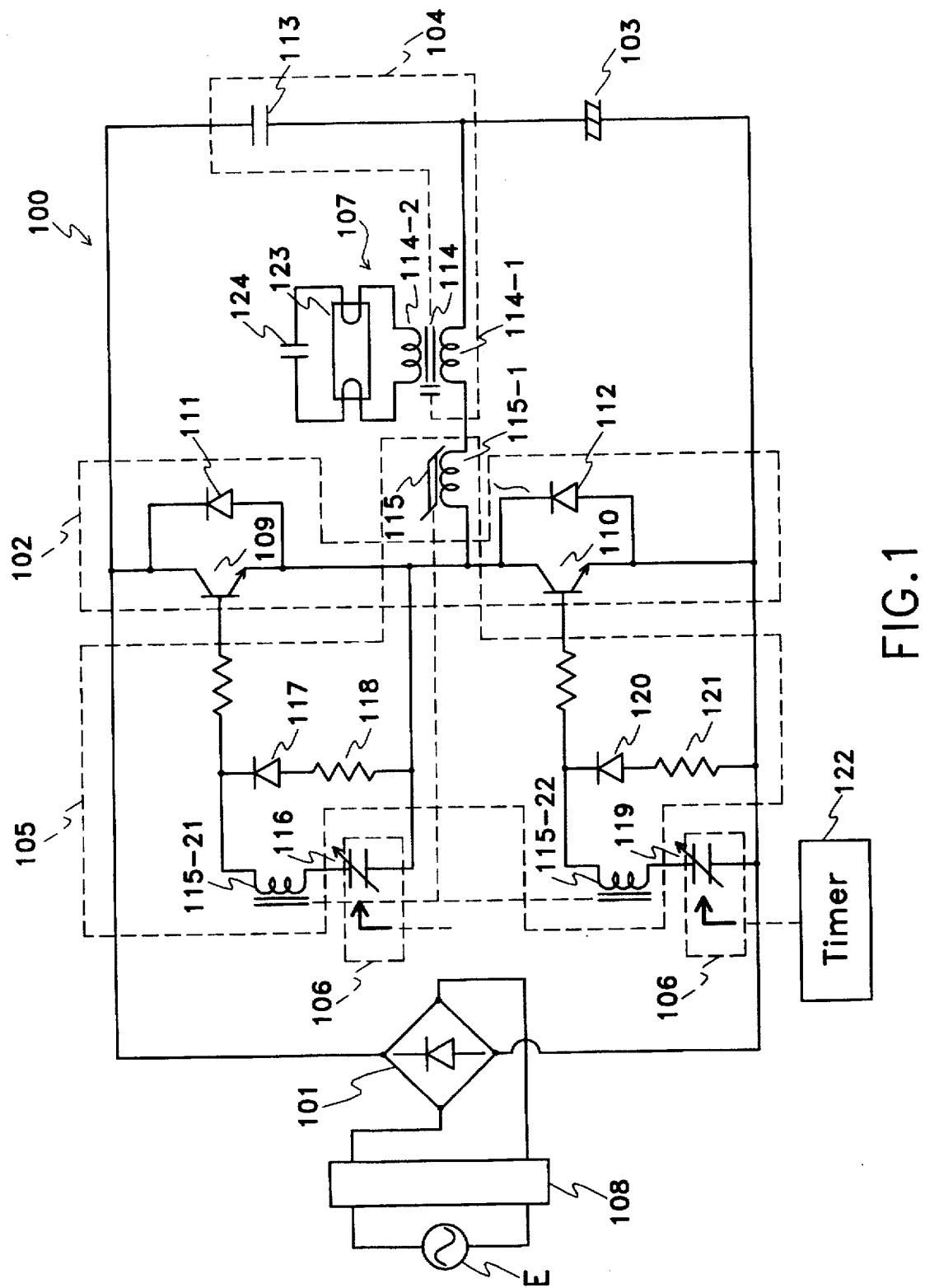
FIG. 1 is a circuit diagram of a power supply apparatus according to a first embodiment of the invention.

Specific exemplary embodiments of the invention will now be explained in detail. A circuit diagram of the first such embodiment is shown in FIG. 1 and equivalent circuits explaining its operation are shown in FIGS. 2(a)–2(e). In FIG. 1 the power supply apparatus is referred to generally by reference numeral 100. Power supply apparatus 100 fundamentally comprises a full wave rectifier 101, a switching circuit 102, first capacitor 103, a series resonance circuit 104, a feedback circuit 105, a control means 106 and an output means 107. Full wave rectifier 101 is connected to a commercial AC power source E, which rectifies AC power into non-smoothed DC power. Full wave rectifier 101 can include a conventional high-speed diode bridge or an equivalent. A filter circuit 108, such as conventional noise filter including a common mode choke coil or a choke coil and a capacitor, is preferably provided between AC power source E and rectifier 101 for blocking high frequency line noise. Switching circuit 102 comprises first and second switches 109, 110 connected in series with each other and coupled across full wave rectifier 101. Each switching device 109, 110 is parallel connected with a corresponding reflux diode 111, 112 to pass current in an opposite direction to a current passing through its corresponding switching device 109, 110. Alternatively, a switching device having a parasitic diode may be used, for example, a field-effect transistor has a parasitic diode. First capacitor 103 having a relatively large capacitance is connected to second switching device 110 in parallel, and it is also coupled to first switching device 109 so that first capacitor 103 is supplied with a charge current through first switching device 109 from rectifier 101 when first switching device 109 is closed (ON) and discharges through second switching device 110 when second switching device 110 is closed (ON). Accordingly first capacitor 103 smoothes non-smoothed DC voltage generated by rectifier 101. Series resonance circuit 104, which comprises of a second capacitor 113 having a relatively small capacitance and a winding 114-1, acting as in inductor, is connected to first switching device 109. A primary winding of a leakage type isolating transformer 114 is used as an inductor in this embodiment. As winding 114-1 is connected to a node between first and second capacitors 103, 113 and to a node between first and second switching devices 109, 110. Charge and discharge currents of first capacitor 103 flow through winding 114-1. Alternate conduction of first and second switching devices 109, 110 is achieved by feedback circuit 105 that provides the base currents on the bases of switching devices 109, 110.

Feedback circuit 105 includes a saturatable current transformer 115 whose primary winding 115-1 is arranged between winding 114-1 and a node connecting first and second switching devices 109, 110 to respond to the resonant current in series resonance circuit 104. Saturatable current transformer 115 has a first and second secondary windings 115-21, 115-22. Each secondary winding 115-21, 115-22 is coupled between the base and the emitter of each switching device 109, 110 so that each secondary winding 115-21, 115-22 supplies the base current to each switching device 109, 110. The base currents are oppositely directed for achieving alternate switching ON of switching devices 109, 110. A first variable capacitor 116 providing a control means 106 is connected to first secondary winding 115-21 in series to vary the saturation time of saturatable current transformer 115 during periods when first switching device 109 is ON. A diode 117 and a resistor 118 are connected to first variable capacitor 116 in parallel to form a discharge path for first variable capacitor 116. Diode 117 and resistor 118 also permit a flow of base-collector current just before first switching device 109 becomes conductive. Similarly, a second variable capacitor 119 is connected in series with second secondary winding 115-22 to vary the saturation time of saturatable current transformer 115 during periods when second switching device 110 is ON. A diode 120 and a resistor 121 are connected in parallel with second variable capacitor 119. Diode 120 and resistor 121 also permit a flow of base-collector current just before second switching device 110 becomes conductive state. A timer 122 is arranged in this embodiment in order to change the capacitances of both variable capacitors 116, 119, which functions to change the capacitance in accordance with an elapsed time from when the AC power E was supplied. When the capacitances of first and second variable capacitors 116, 119 are small, the ON widths of first and second switching devices 109, 110 become short, respectively. When the capacitances are large, the ON widths become long. The secondary winding 114-2 of leakage type isolating transformer 114 is used as an output means 107 in this embodiment, which energizes a discharge lamp 123, such as, for example, a fluorescent lamp. A capacitor 124 connected to lamp 123 in parallel is used for the filament preheating of lamp 123. More, the leakage inductance of transformer 114 is utilized as a ballast for stabilizing the lamp current.

The operation of the power supply apparatus shown in FIG. 1 will now be described with reference to FIGS. 2(a) to 2(e). FIGS. 2(a) to 2(e) are equivalent circuits explaining the operation of the FIG. 1 embodiment.

As AC power is applied to the power supply apparatus, one of switching devices 109, 110 begins to turn ON. This explanation will assume that the first switching device 109 is the first one to turn ON. However, please keep in mind that it could be that the second switching device 110 is the first to turn ON. There is no essential difference between these two possible situations.

When first switching device 109 initially turns ON, first capacitor 103 is charged by a current flow from rectifier 101 through first capacitor 103, winding 114-1 and first switching device 109 and primary winding 115-1 of saturatable current transformer 115. When current transformer 115 is saturated due to the current which flows through the closed circuit, the base current of first switching device 109 is shut off. Therefore, first switching device 109 turns off. A current caused by the energy stored in winding 114-1 flows through second diode 112, which charges first capacitor 103 and saturates current transformer 115. Then second switching device 110 becomes conductive because voltage is applied between the collector and emitter of second switching device 110 due to the voltage across first capacitor 103 and a base-collector current provided by feedback circuit 105 based on the current caused by the energy stored in winding 114-1.

When second switching device 110 is turned ON, forward base current is provided by feedback circuit 105, whereby second switching device 110 is kept conductive until current transformer 115 is saturated. During the period when second switching device 110 is turned ON (FIG. 2(a)), since a closed circuit of first capacitor 103, winding 114-1, first winding 115-1 of current transformer 115 and second switching device 110 is formed, the first capacitor 103 discharges though the closed circuit. When current transformer 115 is saturated due to the current flow through the closed circuit, the base current of second switching device 110 is shut off, whereby second switching device 110 turns off and first diode 111 turns on (FIG. 2(b)). Therefore, winding 114-1 and second capacitor 113 cause series resonance. With this operation, resonance voltage appears in second capacitor 113 and winding 114-1. In addition, a resonance voltage appears across second capacitor 113 and first capacitor 103. The resonance peak voltage is in proportion to an energy stored in winding 114-1, which is determined by a current flowed through second switching device 110 and a voltage applied across second capacitor 113 before second switching device 110 is turned off. Then first switching device 109 becomes conductive because of voltage applied between its collector and emitter due to the resonance voltage and the base-collector current provided by feedback circuit 105 based on the resonance current just before first switching device 109 turns ON.

Figure 2A:
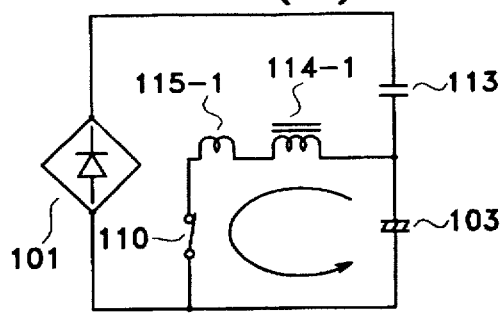
FIGS. 2(a), 2(b), 2(c), 2(d) and 2(e) are equivalent circuit diagrams explaining the operation of the apparatus shown in FIG. 1.
Figure 2B:
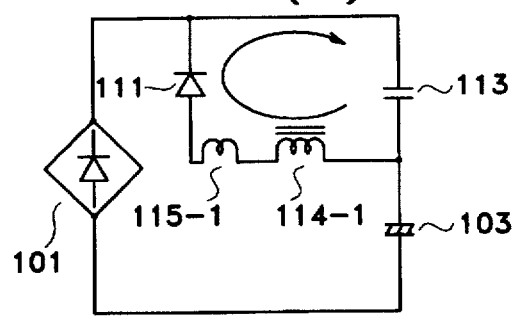
Figure 2C:
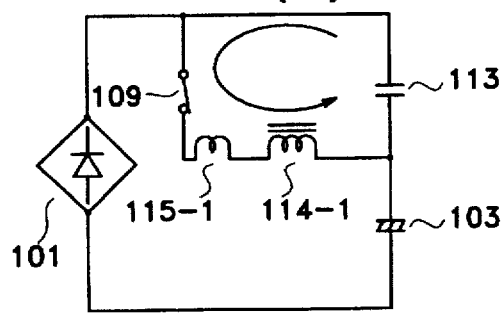
Figure 2D:
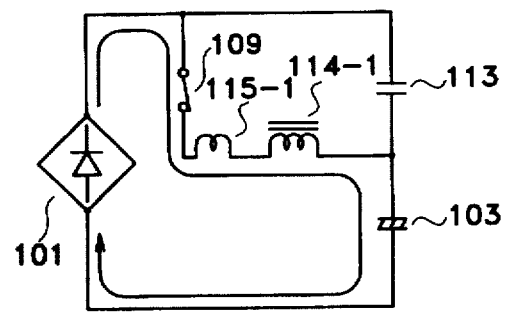
Figure 2E:
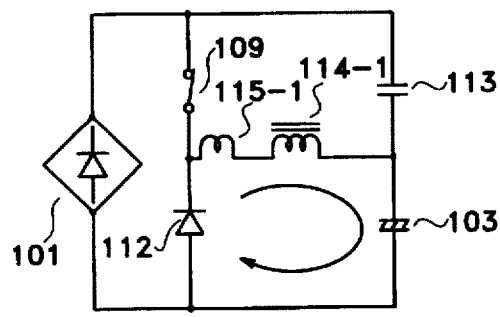

After first switching device 109 turns ON (FIG. 2(c)), the polarity of resonance current is reversed. The resonance voltages occurred during the periods (b), (c) are boosted because they become higher than the output voltage of rectifier 101. When the resonance voltages drop, the voltages across second capacitor 113 and first capacitor 103 also tend to drop. As a result, current flows from rectifier 101 through first capacitor 103, winding 114-1 and first switching device 109 (FIG. 2(d)). When current transformer 115 is saturated, the base current of first switching device 109 is shut off, whereby first switching device 109 turns OFF and second diode 112 turns ON (FIG. 2(e)). During this period (e), current flows through second diode 112 and first capacitor 103 because of the energy stored in winding 114-1 during the periods (c), (d). Thereafter, such states explained above are repeated.

In this embodiment, because the voltages across first and second capacitors 103, 113 can be lower than the voltage generated by rectifier 101 even when the peak voltage is low, an input current can be supplied from AC power source E. Therefore, a sufficient reduction in input current distortion is achieved because of following reason. A duration in which the peak voltage of an AC power source is low, the charge stored in second capacitor 113 is small. Therefore, an initial current, which tends to flow to second capacitor 113 to charge increases. Accordingly, an initial resonant current is increased during period (b). As a result, the resonance voltage can be boosted more when the peak voltage of an AC power source is low. Further, when the peak voltage applied from AC power is low, as the saturation time of current transformer 115 during first switching device 109 is lengthened, the resonance voltage in the series resonance circuit becomes higher. Therefore, the voltages across first and second capacitors 103, 113 can be lower than the voltage generated by rectifier 101 even when the peak voltage is low. In other words, a low voltage in a trough of non-smoothed DC voltage can be mitigated by the resonance voltages, whereby, power supply apparatus 100 generates a constant output. Moreover, the voltages across first and second capacitors 103, 113 can be lower than the voltage generated by rectifier 101 even when the peak voltage is low. Whereby as an input current can be provided from rectifier 101, the input power factor is improved. Reversely, when the peak voltage is high, the saturation time of current transformer 115 is shortened during the period in which first switching device 109 is ON. Although the peak voltage is high, the resonance voltage is not increased significantly, because the energy stored in winding 114-1 is reduced because the ON time of first switching device 109 is shortened. Accordingly, the input power factor and the distortion of the input current are improved.

Lamp 123, which may be a fluorescent lamp, is energized by high frequency voltage generated at secondary winding 114-2 of transformer 114. As a current can be flowed from rectifier 101 during the period (d), input power factor is improved and the distortion is reduced. Furthermore, the output power is easily changed by control means 106. When the capacitance of first variable capacitor 116 becomes larger, it's impedance becomes smaller, thereby lengthening the saturation time of current transformer 115. Therefore, the voltage across first capacitor 103 becomes higher as the charge stored in first capacitor 103 increases. Simultaneously, the interval of switching operation is lengthened because the ON width of first switching device 109 is lengthened, whereby the frequency becomes lower. As a result, the electric power supplying to lamp 123 through the leakage inductance of transformer 114 is increased. Similarly when the capacitance of second variable capacitor 119 becomes larger, the resonance voltage raises up and the frequency becomes lower, whereby, the power supplied to lamp 123 increases. It is preferably selected that the frequency changes in the range above 20 KHz. Reversely, each capacitance becomes smaller, the voltage becomes lower and the frequency becomes higher, whereby the power supplying to lamp 123 is reduced.

For example, timer 122 preferably changes the capacitances of first and second variable capacitors 116, 119 in accordance with the lamp state as shown in Table I.

TABLE I

| | Preheating | Ignition | Steady State |
| --- | --- | --- | --- |
| Capacitance of first variable capacitor | middle | middle | high |
| Capacitance of second variable capacitor | low | high | high |

Power supplied to lamp 123 is reduced to a "low" level before lamp 123 ignites to ensure preheating of the filament of the lamp. Then, lamp 123 is provided with a "middle" amount of power by virtue of the changes of the capacitance, to cause ignition of the lamp. After lamp 123 ignites, "regular" power is provided. Furthermore, if conventional lamp voltage detector is arranged in power supply apparatus in order to detect whether there is any trouble of lamp 123, control means 106 preferably operates so that the power supplied to lamp reduces.

Other embodiments of the invention are shown in FIGS. 3 to 15. Like reference characters designate identical or corresponding elements to those of the above described first embodiment. The construction and operation of the following embodiments are substantially the same as the first embodiment and, therefore, a detailed explanation of its operation is not provided. Description will be limited to those features that are different from embodiment to embodiment.

Figure 3:
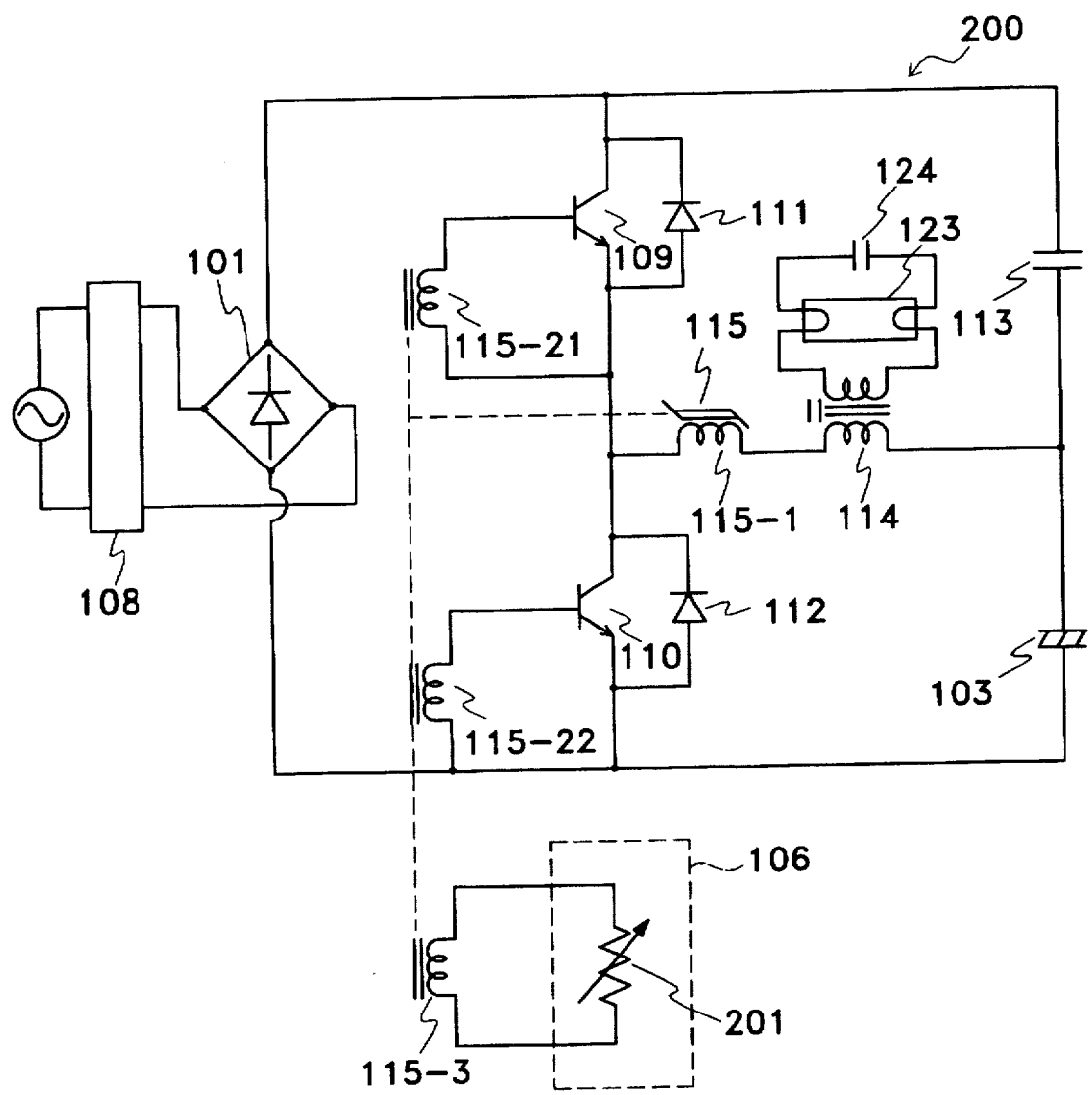
FIG. 3 is a circuit diagram of a power supply apparatus according to a second embodiment of the invention.

FIG. 3 is a circuit diagram of a power supply apparatus 200 according to a second embodiment of the present invention. A saturatable current transformer 115 has first, second and auxiliary windings 115-21, 115-22, 115-3 at a secondary side. A resistor 201, as control means, is connected to auxiliary winding 115-3 in order to vary the saturation time of current transformer 115. Accordingly, the saturation time of current transformer 115 is shortened as the impedance of resistor 201 is increased. This power supply apparatus 200 operates in the same manner as the first embodiment shown in FIG. 1. Thus, in this embodiment, control means 106 is simplified.

Figure 4:
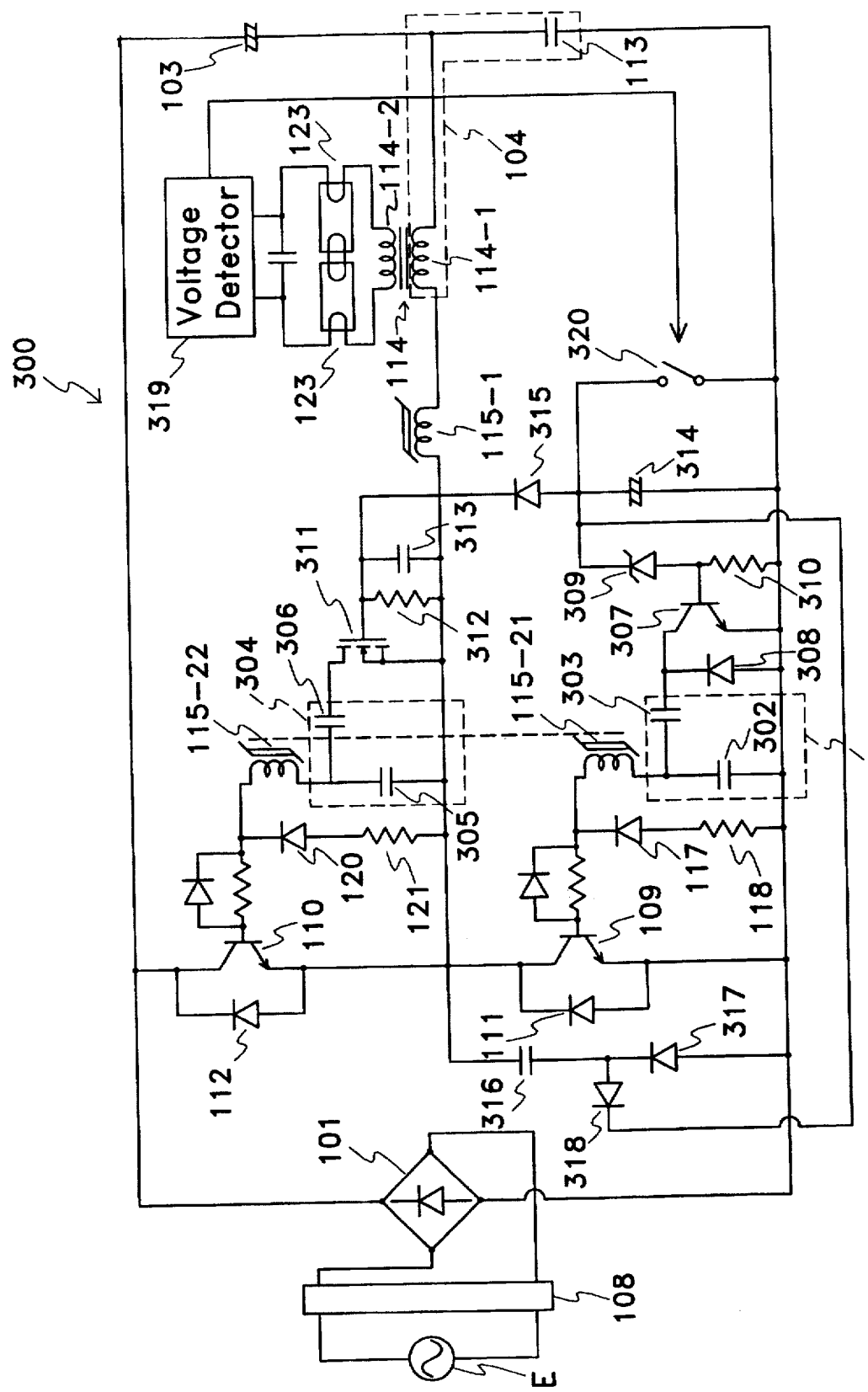
FIG. 4 is a circuit diagram of a power supply apparatus according to a third embodiment of the invention.

FIG. 4 shows a power supply apparatus 300 according to a third embodiment of the present invention. The positions of first and second switching devices 109, 110 and first and second capacitors 103, 113 are reversed compared with above embodiments. A first variable capacitor circuit 301 operating as a control means, comprising a capacitor 302 and a capacitor 303 connected in parallel with each other, is connected to first secondary winding 115-21 to vary the saturation time of saturatable current transformer 115 during the period in which first switching device 109 is ON. Similarly, a second variable capacitor circuit 304 operating as a control means, which comprises a capacitor 305 and a capacitor 306 connected in parallel with each other, is connected to second secondary winding 115-22 to vary the saturation time of saturatable current transformer 115 during the period in which second switching device 110 is ON. A circuit described as follows is provided in order to change the impedances of first and second variable capacitor circuits 301, 304. A transistor 307 and a diode 308 are connected to capacitor 302 in parallel. The base of transistor 307 is connected to a junction between a zener-diode 309 and a resistor 310. A FET 311 is connected to capacitor 306 in series. A resistor 312 and a capacitor 313 are provided between the gate and source of FET 311. An electrolytic capacitor 314 is coupled across zener-diode 309 and resistor 310 for supplying control power. Electrolytic capacitor 314 is connected to the gate of FET 311 through a diode 315. Diode 315 functions to block an inverse current. Electrolytic capacitor 314 is also connected to the junction between a capacitor 316 and a diode 317 through a diode 318. Capacitor 316 and diode 317 are connected to first switching device 109 in parallel. A pair of lamps 123, which may be fluorescent lamps, connected in series is coupled to secondary winding 114-2 of a leakage isolating transformer 114. A voltage detector 319 is provided across a capacitor 124 in order to respond to the lamp voltage. Capacitor 124 forms a filament preheating path.

For instance, as the lamp voltage becomes higher according to the lamp deterioration, the deterioration can be detected by voltage detector 319. Voltage detector 319 is arranged so as to output a signal to a switch 320 connected to electrolytic capacitor 314 in parallel, when the lamp voltage becomes high. Switch 320 is closed whenever it receives the signal. Therefore, the capacitances of first and second variable capacitor circuits 301, 304 are changed when the lamp deteriorates, because transistor 307 and FET 311 are turned OFF due to reduction of the control voltage generated by electrolytic capacitor 314 when switch 320 turns ON.

The operation of control means in this embodiment will now be explained. Electrolytic capacitor 314 charges by a voltage applied across first switching device 109 when device 109 turns OFF, however, capacitor 314 has little charge just after AC power is provided. Therefore, transistor 307 and FET 311 are non-conductive, whereby, impedances of first and second variable capacitor circuits 301, 304 are determined by capacitor 302 and capacitor 305, respectively. Accordingly, the saturation time of saturatable current transformer 115 is shortened as the impedances are relatively low. As a result, the resonance voltage in series resonance circuit 104 is low and the frequency becomes higher, whereby, the filament of lamps 123 is preheated before the lamps ignite. Then electrolytic capacitor 314 has enough voltage to provide a control voltage to transistor 307 and FET 311. Accordingly, transistor 307 and FET 311 become conductive, whereby, capacitor 303 and capacitor 306 are connected to capacitor 302 and capacitor 305 in parallel, respectively. Therefore, the saturation time of current transformer 115 is lengthened as the impedances of variable capacitor circuits 301, 304 are increased. As a result, the resonance voltage in series resonance circuit 104 is higher and the frequency becomes lower, whereby lamps 123 are provided with the normal power required to operate.

When lamp deterioration occurs, switch 320 connected to electrolytic capacitor 314 in parallel turns ON due to the signal generated by voltage detector 319. Then, transistor 307 and FET 311 turn OFF due to the reduction of the control voltage across electrolytic capacitor 314. As a result, the output is reduced as the filament preheats.

Figure 5:
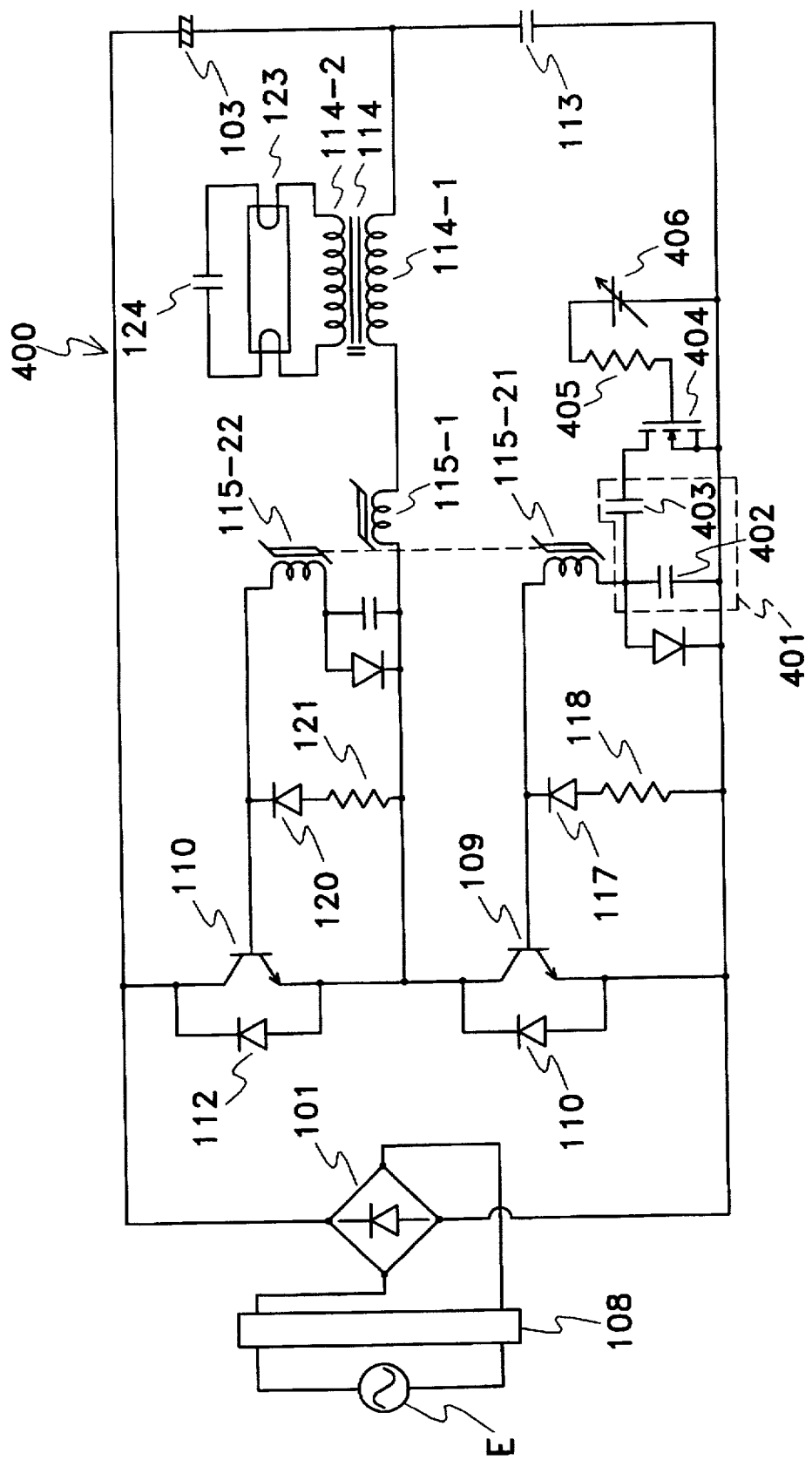
FIG. 5 is a circuit diagram of a power supply apparatus according to a fourth embodiment of the invention.

FIG. 5 shows the fourth embodiment of the invention. A control means 401 for varying the saturation time of current transformer 115 is provided in only one secondary winding 115-21 of saturated current transformer 115 corresponding to first switching device 109, which includes two capacitors 402, 403. Capacitor 403 is coupled to a FET 404 whose gate is connected to a resistor 405 and a variable DC battery 406. The output of power supply apparatus 400 increases as the DC voltage generated by battery 406 increases, because the combined impedance of capacitors 402, 403 is increased as the resistance between the drain and source of FET 404 is reduced. According to this embodiment, because control means 401 is provided in one secondary winding 115-21 of saturated current transformer 115, the arrangement of this apparatus 400 is simplified.

Figure 6:
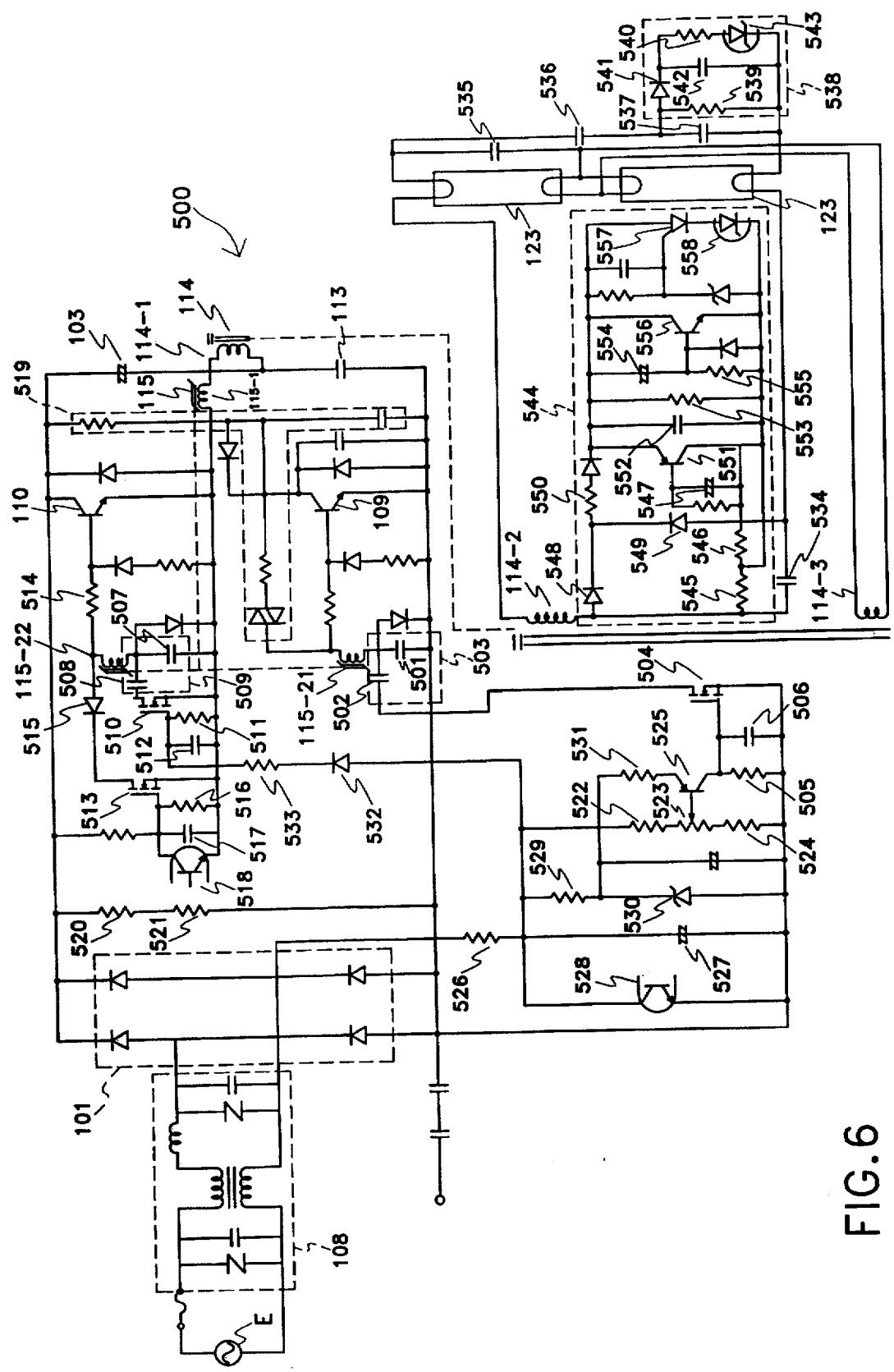
FIG. 6 is a circuit diagram of a power supply apparatus according to a fifth embodiment of the invention.
Figure 8:
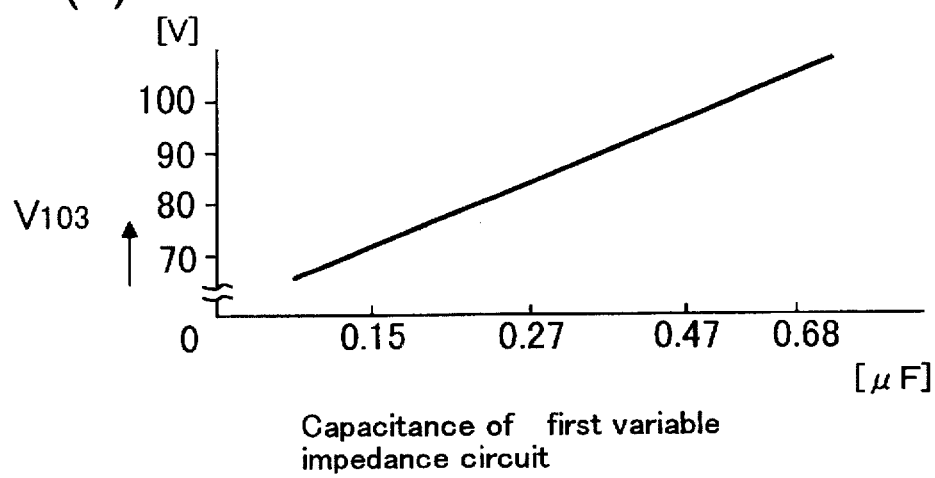
FIGS. 8(a), 8(b) and 8(c) are graphs showing the relationship between the capacitance of variable impedance circuit and the voltage (V103) across a first capacitor, the output voltage (V101) of a rectifier and the lamp wattage (W123) of the power supply shown in FIG. 6, respectively.
Figure 8:
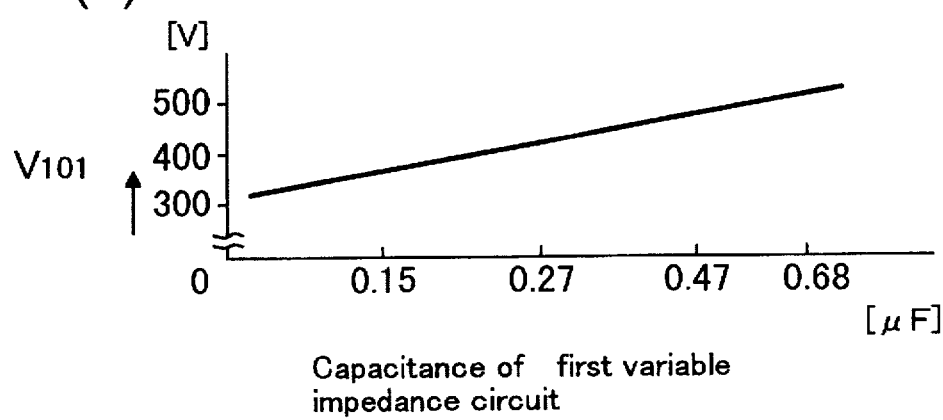
Figure 8:
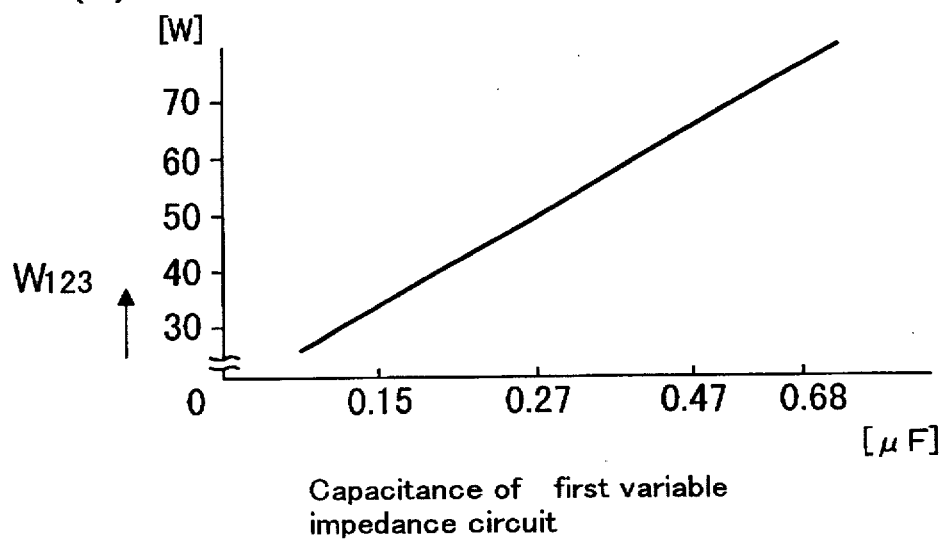

FIG. 6 shows a power supply apparatus 500 according to a fifth embodiment of the invention. Capacitors 501, 502 forming a first control circuit (control means) 503 are connected to first secondary winding 115-21 of saturatable current transformer 115. A capacitor 502 is connected to a FET 504. A parallel circuit of a resistor 505 and a capacitor 506 is connected between the gate and source of FET 504.

Capacitors 507, 508 forming a second control circuit (control means) 509 are connected to second secondary winding 115-22 of saturatable current transformer 115. A capacitor 508 is connected to FET 510. A parallel circuit of a resistor 511 and a capacitor 512 is connected between the gate and source of FET 513. The base of second switching device 110 is connected to a FET 513 through a resistor 514 and a diode 515. The gate of FET 513 is connected to positive pole of rectifier 101. A parallel circuit of a resistor 516, capacitor 517 and photo-transistor 518 is connected between the gate and the source of FET 513.

A starting circuit 519 is arranged across rectifier 101 so that first switching device 109 initially begins to turn ON when AC power is supplied.

Resisters 520 to 524 are connected across rectifier 101. Resistor 523 is connected to the base of a transistor 525 whose collector and base are coupled to the gate of FET 504 and capacitor 506, respectively. One of the diodes forming rectifier 101 is connected to a series circuit of a resistor 526 and a capacitor 527 in parallel so as to introduce a half-wave rectified voltage. Capacitor 527 is coupled to a photo-transistor 528, and a series circuit of a resistor 529 and a zener diode 530 in parallel, respectively. The junction between resistor 529 and zener diode 530 is connected to the emitter of transistor 525 through a resistor 531. A positive pole of capacitor 527 is coupled to the gate of FET 510 through a diode 532 and a resistor 533.

Two lamps 123 connected in series are connected to a secondary winding 114-2 of leakage isolating transformer 114 through a capacitor 534 which blocks a DC current. Moreover, leakage isolating transformer 114 has also an auxiliary winding 114-3 for supplying a preheat current to the filaments of lamps 123. A capacitor 535 is connected to one of lamps 123 so that lamps 123 can be ignited in order. A resonance capacitor 536 is connected across two lamps 123, which is connected to a capacitor 537. A detector 538 is coupled across capacitor 537 in order to detect whether lamps 123 are coupled to the circuit. Detector 538 comprises resisters 539, 540 a diode 541, a capacitor 542 and a photo-diode 543 so that photo-diode 543 emits a photo signal when the lamps 123 are attached to the circuit. Another voltage detector 544 is also provided across capacitor 534 in order to detect a half-wave discharge due to a deterioration of the filament with use. Detector 544 is composed as follows. Resistors 545, 546 are connected across capacitor 534 in parallel, whose voltage is applied to a capacitor 547 through a rectifier composed of diodes 548, 549 and a resistor 550. Capacitor 547 is coupled to a transistor 551 as to control transistor 551. A capacitor 552 and a resistor 553 are coupled between the emitter and collector of transistor 551. A capacitor 554 and a resistor 555 are connected to resistor 553 in parallel for forming a timer circuit. The junction of capacitor 554 and resistor 555 is connected to a transistor 556. Transistor 556 is connected to a switch 557, such as PUT (programmable uni-junction transistor), and a photo-diode 558 in series. Transistor 556 is turned ON during a time determined by capacitor 554 and resistor 555 so that it can prevent a high voltage generating at ignition of lamps 123 from applying to switch 557 and photo-diode 558. After the time determined by capacitor 554 and resistor 555, transistor 556 turns OFF.

An exemplary circuit of the present embodiment of FIG. 6 has the values shown in Table II.

TABLE II

| Ref. No. | Element Description | Typical Value |
| --- | --- | --- |
| E | AC Power | 200 Volts |
| 103 | first capacitor | 270 microfarad |

TABLE II-continued

| Ref. No. | Element Description | Typical Value |
|---|---|---|
| 114 | inductor - primary winding | 0.7 mH |
|  | secondary winding | 5 mH |
|  | coupling factor | 0.7 |
| 115 | saturatable current transformer |  |
|  | primary winding | 2 turns, |
|  | first secondary winding | 4 turns |
|  | second secondary winding | 3 turns |
| 113 | second capacitor | 0.022 micro F |
| 123 | lamp | FHF32EX-N (Toshiba Lighting and Technology) |
| 536 | capacitor | 4700 pF |
| 501 | capacitor | 0.1 micro F |
| 502 | capacitor | 1.0 micro F |
| 507 | capacitor | 0.15 micro F |
| 508 | capacitor | 1.0 micro F |
| 504, 513 | FET | 2SK679 (NEC) |

The operation of a control means will now be explained. Capacitor 527 is charged up by a half-wave rectified voltage, however, capacitor 527 has a little charge just after AC power is provided. Therefore, transistor 525, FET 504 and FET 510 have a non-conductive state, whereby, impedances of control circuits 503, 509 are relatively small. Accordingly, the saturation time of saturatable current transformer 115 is shortened as the impedances are relatively low. As a result, the resonance voltage in series resonance circuit of capacitor 113 and winding 114-1 is low and the frequency becomes higher, whereby, the filament preheating of lamps 123 is ensured before lamps 123 ignite.

Then capacitor 527 has enough voltage to provide a voltage to FET 504 and FET 510. Accordingly, FET 504 and FET 510 become conductive state, whereby, capacitor 502 and capacitor 508 are connected to capacitor 501 and capacitor 507 in parallel, respectively. Therefore, the saturation time of current transformer 115 is lengthened as the impedances increase. As a result, the resonance voltage in the series resonance circuit becomes higher and the frequency becomes lower, whereby lamps 123 are provided with operational power.

For instance, a 240 volts are applied to lamps 123 for preheating and 400 volts are applied for the ignition in accordance with the capacitances of circuits 503, 509 which are continuously changed to 0.22 and 1.15 micro farad from 0.08 and 0.15 micro farad, respectively. The capacitances are 0.5 and 1.1 microfarad in a steady lamp operation, respectively.

If AC voltage is reduced due to the fluctuations of AC power source E, the emitter current of transistor 525 is increased, whereby the gate voltage of FET 504 is raised. Accordingly, the resonance voltage in the series resonance circuit is higher and the frequency becomes lower as the impedance of the first control circuit BOB increases. Reversely, in the case of AC voltage becomes high, the resonance voltage becomes lower and the frequency becomes higher. According to such operation, a power supply apparatus 500 of this embodiment can generate a constant output power.

Further, when lamps 123 occur half-wave discharge owing to a deterioration of the filament with use, a voltage across capacitor 534 is raised. Therefore, transistor 551 turns OFF because a voltage across capacitor 547 becomes higher, whereby a voltage across capacitor 552 is raised as transistor 556 is OFF as described above. Then switch 557 turns ON, photo-diode 558 emits photo signal. Accordingly, photo-transistor 528 optically coupled to photo-diode 558 is turned ON, a voltage across capacitor 527 is reduced. As a result, the output is reduced as same as the case of filament preheating.

When lamps 123 are not attached to the circuit, as current which flows through capacitor 537 is shut off, a photo signal is not emitted by photo-diode 543. Accordingly, second switching device 110 is shorted between the base and the emitter thereof, because photo-transistor 518 optically coupled with photo-diode 543 is turned OFF, whereby, the switching action of second switching device 110 is ceased.

FIG. 7 is a table showing experimental results related to harmonics noise radiated from an apparatus according to this embodiment and the reference values in a regulation published by The Japanese Ministry of International Trade and Industry. The experimental result is indicated as relative values compared with the fundamental wave on each harmonics degree. The harmonics noises of the present apparatus are below the reference values on each harmonics degrees, it satisfies the regulation enough.

Figure 9:
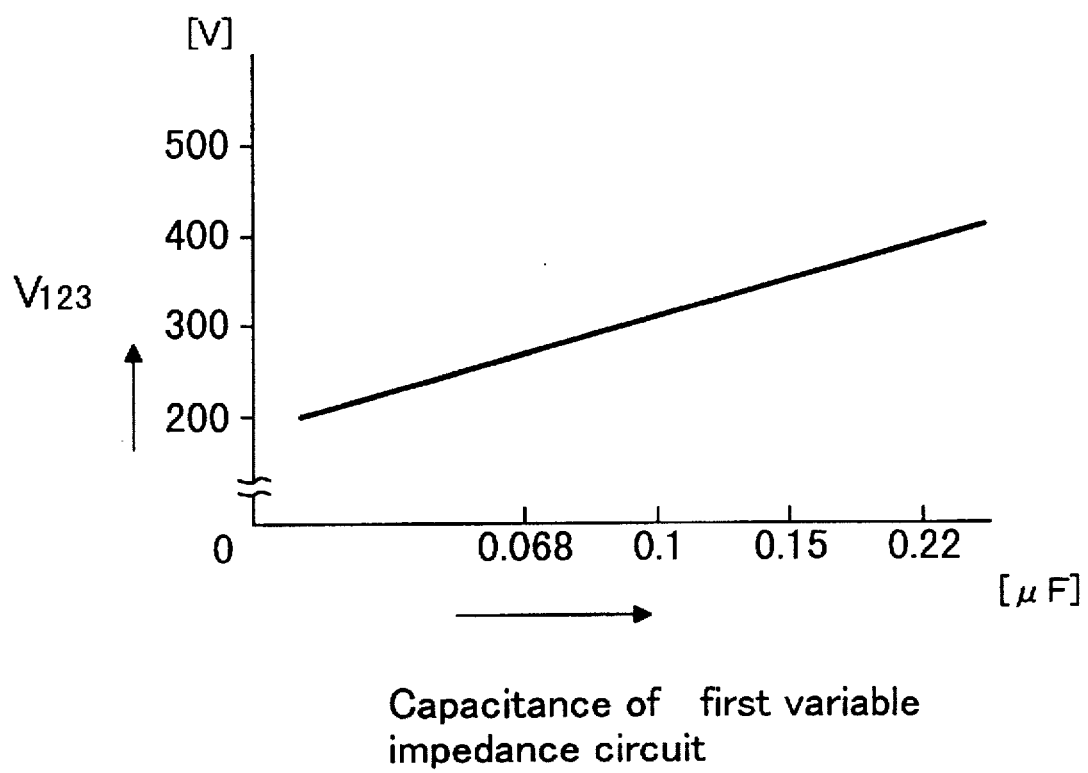
FIG. 9 is a graph showing the relationship between the capacitance of variable impedance circuit and the voltage (V123) across a discharge lamp, such as, for example, a fluorescent lamp, of the power supply shown in FIG. 6 before the lamp ignites.

FIG. 8(a) shows graphically the relationship between the capacitance of first variable impedance circuit and the voltage (V103) across first capacitor 103. FIG. 8(b) shows graphically the relationship between the capacitance of first variable impedance circuit and the voltage (V101) across the output of rectifier 101. FIG. 8(c) shows the relationship between the capacitance of first variable impedance circuit and the power (W123) applied to lamps 123. FIG. 9 shows the relationship between the capacitance of first variable impedance circuit and the voltage (V123) across lamps 123 before lamps ignite. The relationship is confirmed when the capacitance of second variable impedance circuit is fixed at 1.15 microfarad, however, similar results are obtained whenever the capacitance is varied. As shown in the various graphs, those voltages and a power applied to lamps 123 are preferably changed in accordance with capacitance value.

Figure 10:
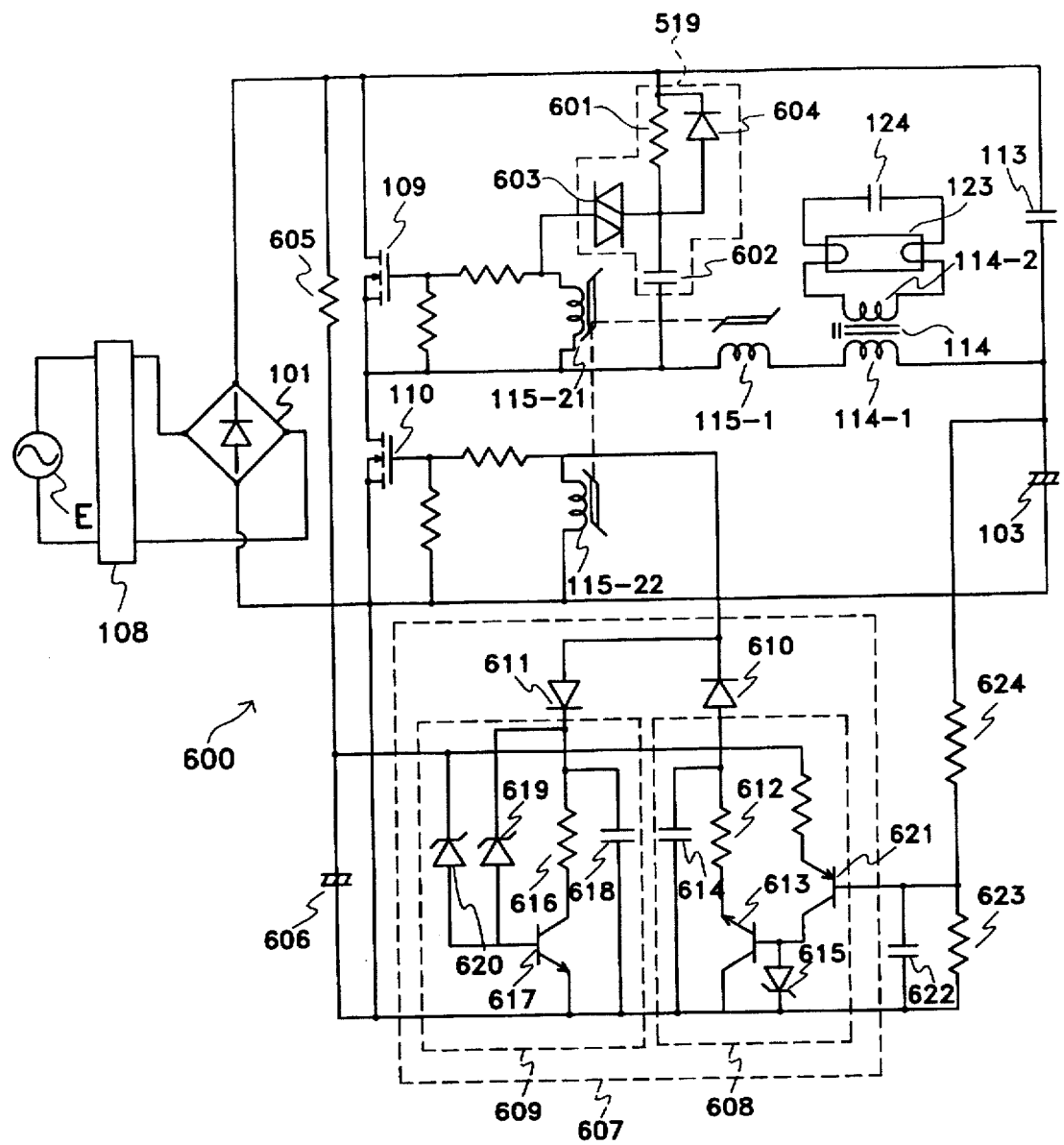
FIG. 10 is a circuit diagram of a power supply apparatus according to a sixth embodiment of the invention.

FIG. 10 is a circuit diagram of a power supply apparatus 600 according to a sixth embodiment of the invention. The first and second switching devices 109, 110 are constituted by FETs. A starting circuit 519 is provided to first switching device 109 so as to operate first switching device 109 first, which is composed with a resistor 601, a capacitor 602, a voltage regulator device 603 and a diode 604. A resistor 605 and a capacitor 606 are connected across rectifier 101. A control circuit (control means) 607 is arranged across capacitor 606 in order to vary the saturation time of current transformer 115. Control circuit 607 includes a first control circuit 608 for varying the saturation time when first switching device 109 turns ON and a second control circuit 609 for varying the saturation time when second switching device 110 turns ON. First and second control circuits 608, 609 are coupled to first secondary winding 115-21 of current transformer 115 through a diode 610 and a diode 611, respectively, so that control circuits 608 and 609 flow current in opposite directions. First control circuit 608 has a first variable impedance circuit comprising a resistor 612 and a transistor 613. A capacitor 614 is connected across resistor 612 and transistor 613 for smoothing the output provided from secondary winding 115-22. A zener diode 615 is connected between the base and collector of transistor 613 so as to prevent an excess voltage from being applied to first switching device 109 when secondary winding 115-22 has an undesirable high potential. Therefore, a constant voltage is provided across the gate and source of first switching device 109. Similarly second control circuit 609 has a second variable impedance circuit comprising a resistor 616 and a transistor 617. A capacitor 618 is connected across resistor 616 and transistor 617 for smoothing the output provided from secondary winding 115-22. A zener diode 619 is connected between the base of transistor 617 and diode 611 so as to prevent an excess voltage from being applied to second switching device 110. A zener diode 620 is also connected between the base of transistor 617 and capacitor 606. A transistor 621 is connected to transistor 613 and capacitor 606 so that the collector and the emitter of transistor 621 are coupled to the base of transistor 613 and capacitor 606. A capacitor 622 and a resistor 623 are connected between the base and collector of transistor 621 in parallel. Resistor 623 is connected to first capacitor 103 through a resistor 624.

The operation of control circuit will now be explained. Capacitor 606 is charged by a half-wave rectified voltage. However, capacitor 606 has little charge just after AC power is provided, whereby, transistors 621, 613 in first variable impedance circuit 608 are OFF. Accordingly, the saturation time of current transformer 115 is shortened during periods when first switching device 109 is ON, because resistor 612 connected to secondary winding 115-22 in parallel is disconnected. Similarly, zener diode 620 and transistor 617 in second variable impedance circuit 609 are OFF just after AC power is provided, whereby, the saturation time of current transformer 115 is also shortened during periods when second switching device 110 is ON. As a result, the resonance voltage in series resonance circuit composed of second capacitor 113 and winding 114-1 is low and the frequency becomes higher, whereby, the filament preheating of lamps 123 is ensured before lamps 123 ignite.

However, when capacitor 606 has enough charge to provide a voltage to transistors 621, 613, the saturation time of current transformer 115 is lengthened when first switching device 109 is ON, because resistor 612 connected to secondary winding 115-22 in parallel is connected. In the same manner, the saturation time of current transformer 115 is lengthened during periods when second switching device 110 is ON. As a result, the resonance voltage in the series resonance circuit is higher and the frequency becomes lower, whereby lamps 123 are provided the power required to operate.

When a voltage across first capacitor 103 excessively increases, the base current of transistor 621 is reduced because a voltage across capacitor 622 also increases. Therefore, the saturation time of current transformer 115 is shortened during periods when first switching device 109 is ON, thereby preventing excessive output from being generated.

Figure 11:
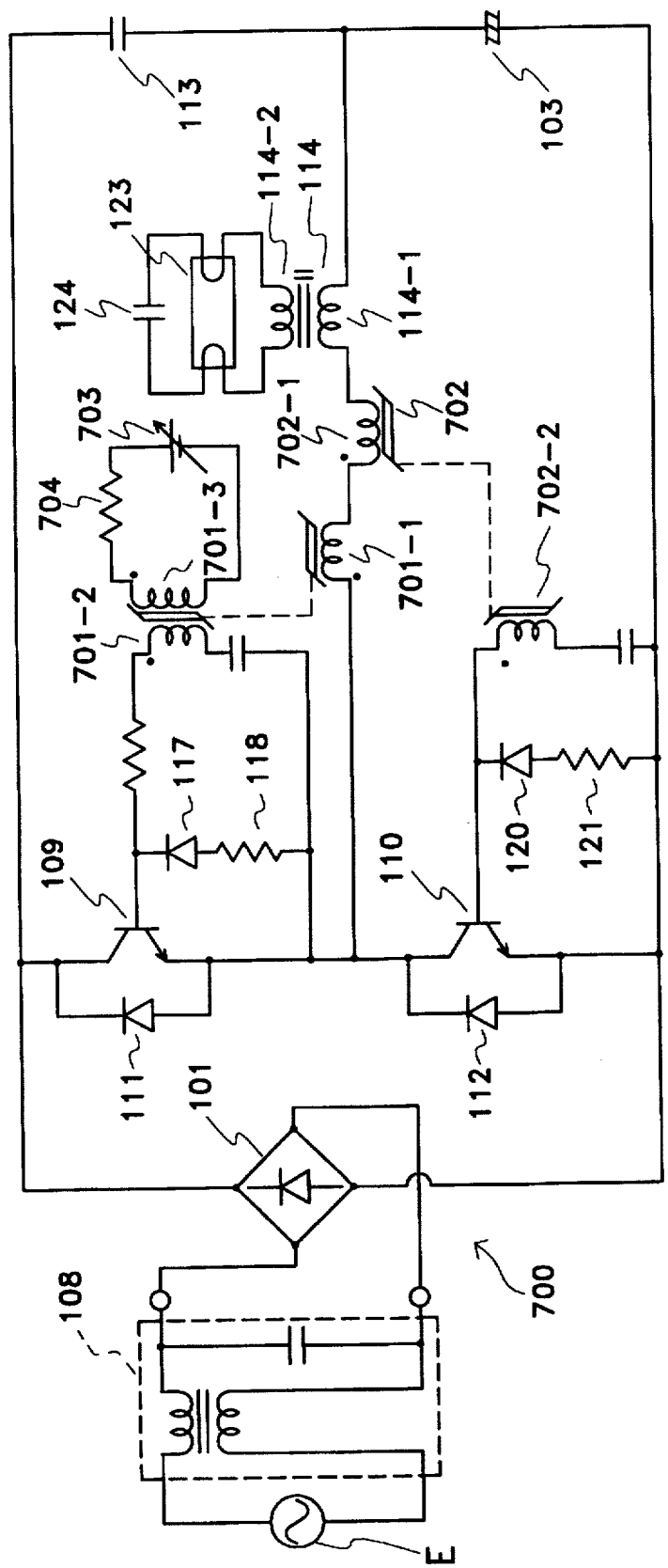
FIG. 11 is a circuit diagram of a power supply apparatus according to a seventh embodiment of the invention.

FIG. 11 is a circuit diagram of a power supply apparatus 700 according to a seventh embodiment of the invention. Each primary winding 701-1, 702-1 of first and second saturatable current transformers 701, 702 is arranged in a resonant circuit including second capacitor 113 and winding 114-1. Secondary windings 701-2, 702-2 of first and second saturatable current transformers 701, 702 are connected between the base and the emitter of first and second switching devices 109, 110. Secondary winding 701-2 of first saturatable current transformer 701 is magnetically coupled with a control winding 701-3. Control winding 701-3 is connected to variable DC source 703 through a resistor 704 for varying the saturation time of first saturatable current transformer 701. The ON width of first switching device 109 is varied in accordance with the DC voltage generated by variable DC source 703.

Figure 12:
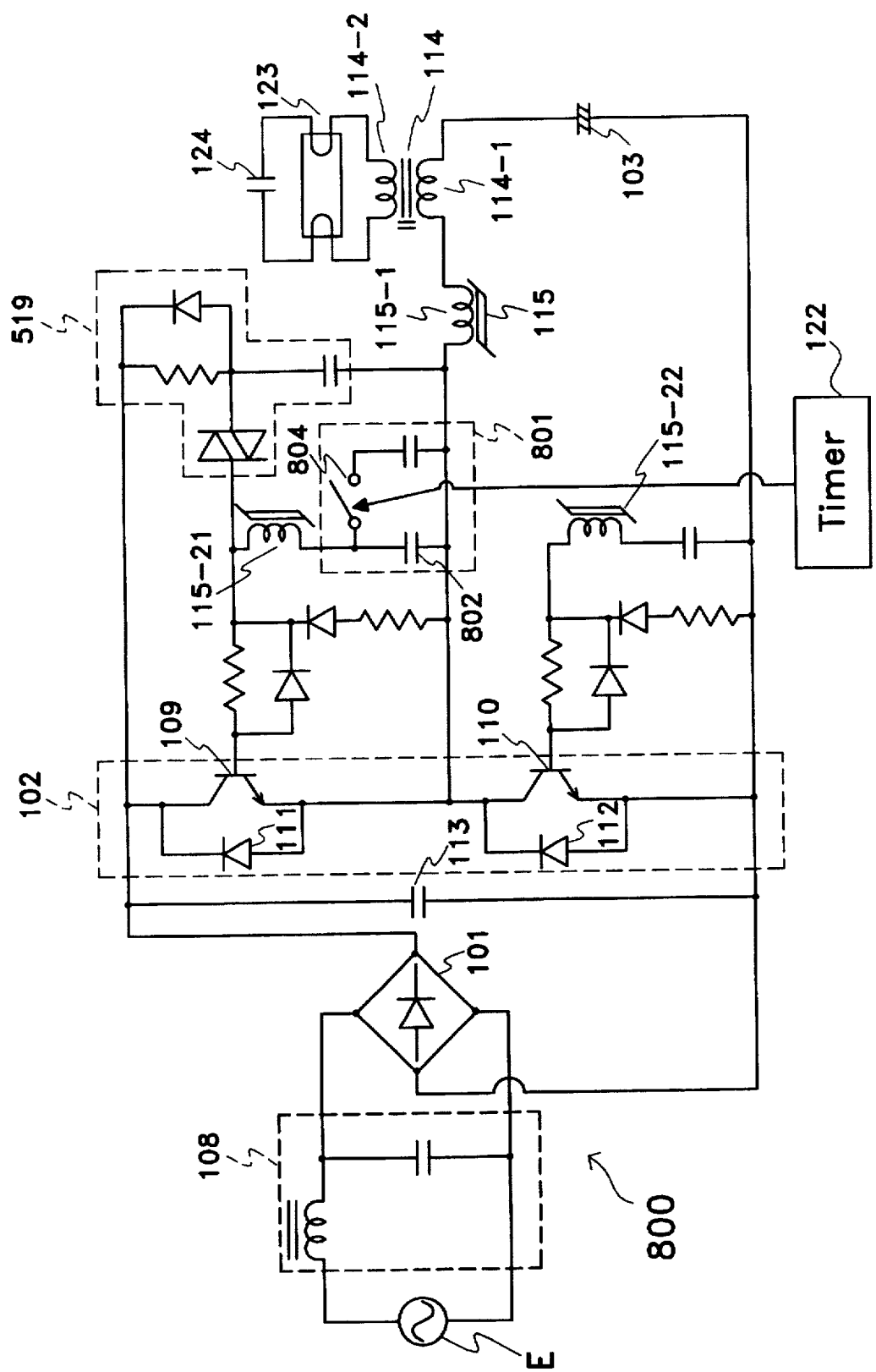
FIG. 12 is a circuit diagram of a power supply apparatus according to a eighth embodiment of the invention.

FIG. 12 is a circuit diagram of a power supply apparatus 800 according to an eighth embodiment of the invention. A second capacitor 113 is connected to switching circuit 102 in parallel for forming a resonant circuit in cooperation with winding 114-1, whereby, second capacitor 113, winding 114-1 and first capacitor 103 are forming a series resonance circuit. Accordingly, the resonance current flows through winding 114-1, primary winding 115-1 of current transformer 115, a diode 111, second capacitor 113 and first capacitor 103 in one direction. In the opposite direction, the resonance current flows through winding 114-1, first capacitor 103, second capacitor 113, first switching device 109 and primary winding 115-1 of current transformer 115. However, the resonance is not substantially influenced by first capacitor 103, because first capacitor 103 has a relatively large capacitance. The ON time of first switching device 109 is controlled by a control means 801. Control means is constituted by two capacitors 802, 803 connected in parallel through a switch 804. Switch 804 is coupled to a timer 122 so as to operate at a predetermined time after AC power is applied. When the voltage across second capacitor 113 is reduced, a voltage across first capacitor 103 is also reduced due to the resonance. As the impedance of first capacitor 103 is very small compared with that of second capacitor 113, a charge current can flow to first capacitor 103 from rectifier 101. As a result, it performs a sufficient smoothing operation and reduces input current distortion as in the other embodiments described above.

Figure 13:
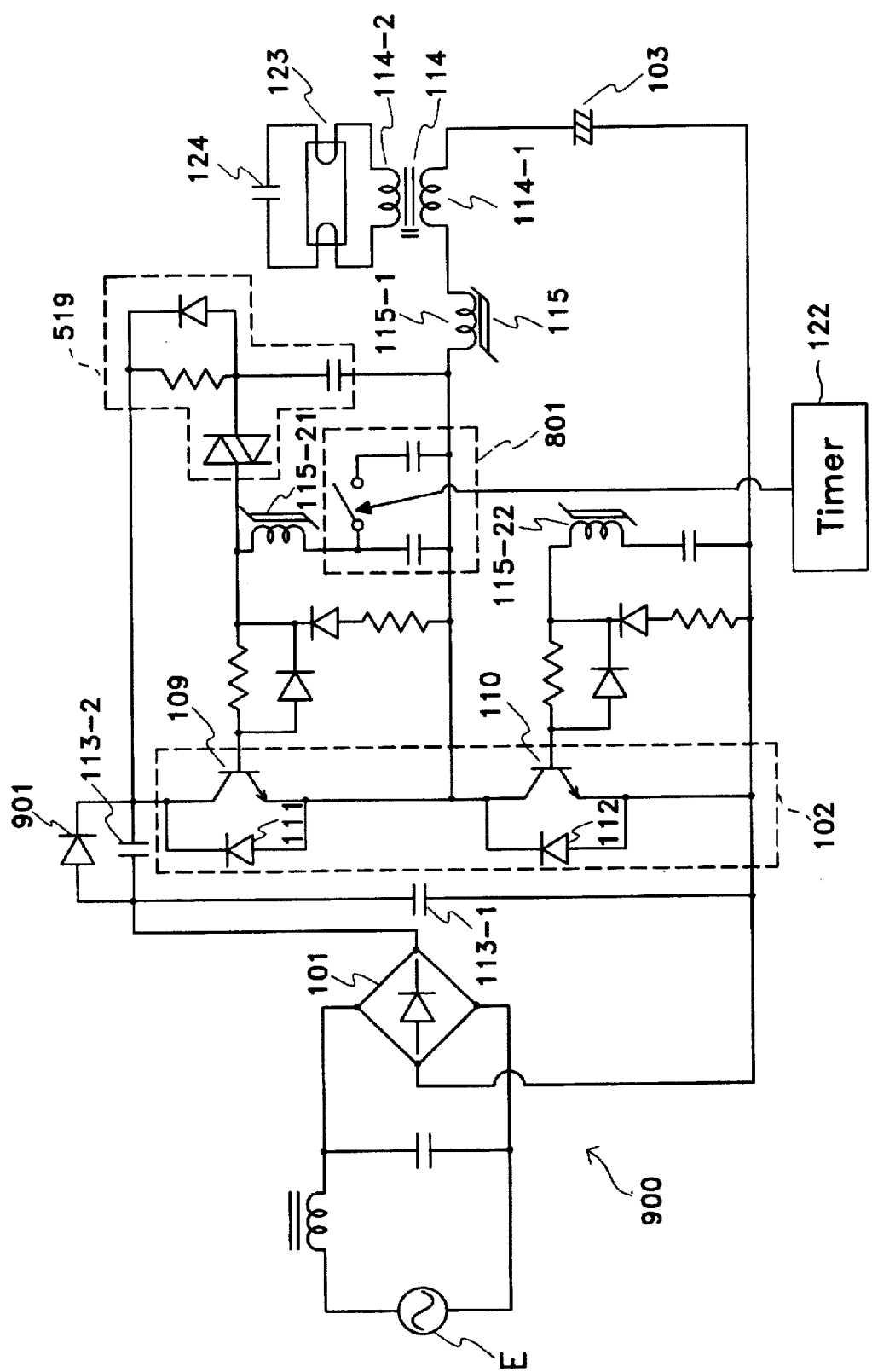
FIG. 13 is a circuit diagram of a power supply apparatus according to a ninth embodiment of the invention.

FIG. 13 is a circuit diagram of a power supply apparatus 900 according to a ninth embodiment of the invention. Two capacitors 113-1, 113-2, which are connected to switching circuit 102 in parallel, operate as a second capacitor. A diode 901 is preferably arranged across capacitor 113-2 for blocking a reverse current.

Figure 14:
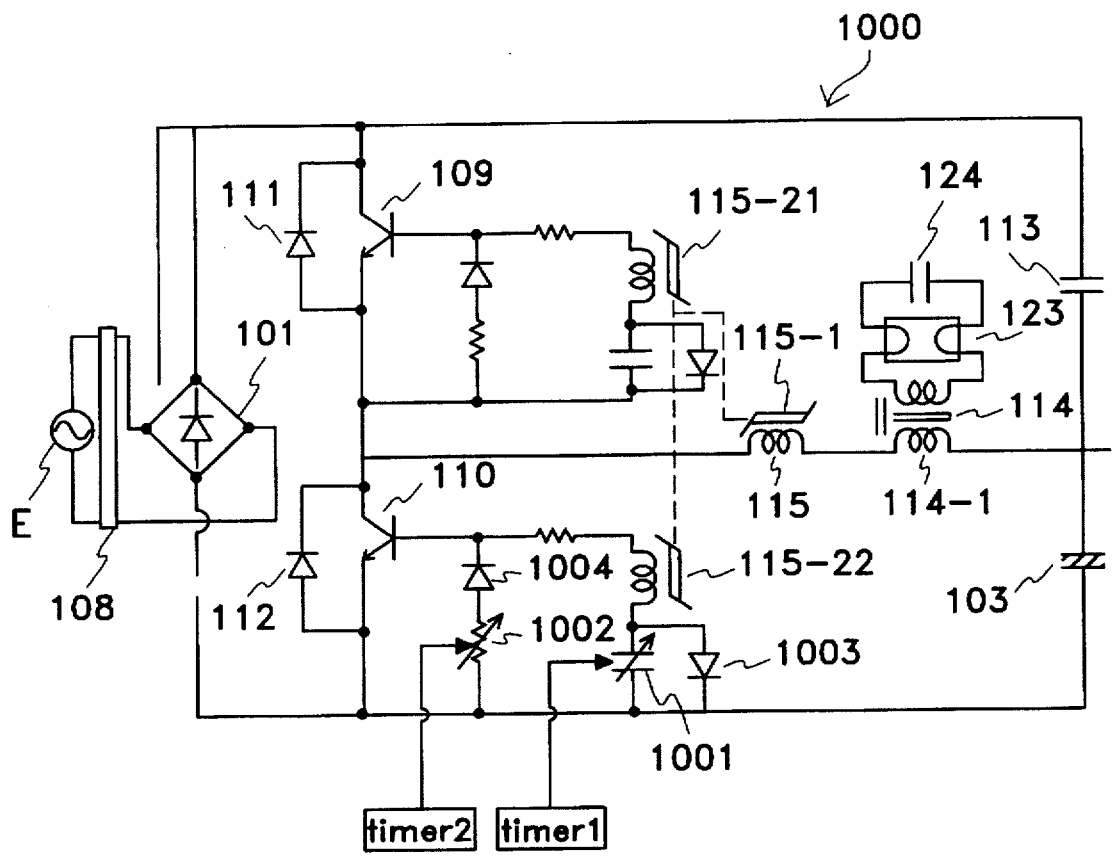
FIG. 14 is a circuit diagram of a power supply apparatus according to a tenth embodiment of the invention.

FIG. 14 is a circuit diagram of a power supply apparatus 1000 according to a tenth embodiment of the invention. A variable impedance circuit, which includes a variable capacitor 1001 and a variable resistor 1002, is connected to second secondary winding 115-22 of current transformer 115. Variable capacitor 1001 and variable resistor 1002 are connected to diodes 1003, 1004, respectively, so as to flow currents in opposite directions. Second secondary winding 115-22 is connected to second switching device 110 provided at the lower potential side of the output of rectifier 101.

The ON times of first and second switching devices 109, 110 are controlled in accordance with the impedance changes of variable resistor 1002 and variable capacitor 1001. It is an advantage that the arrangement can be simplified because variable resistor 1002 also functions as the discharge resistor of variable capacitor 1001. More, as the variable impedance circuit is connected to a secondary winding coupled to a switching device arranged at a lower potential side, it is easy to isolate the variable impedance circuit.

Figure 15:
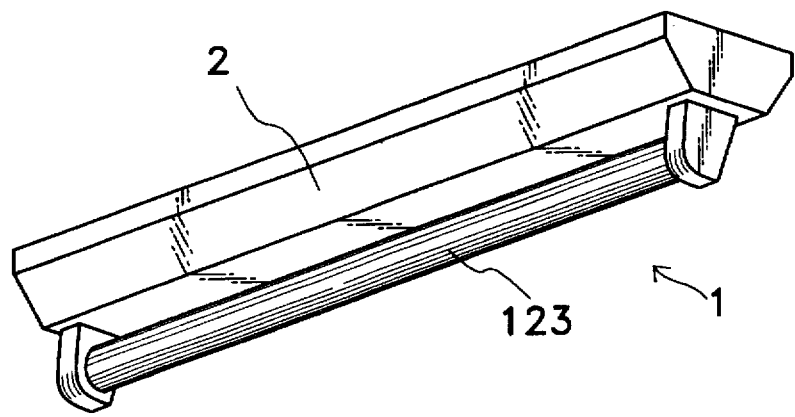
FIG. 15 is a perspective view of a lighting apparatus according to an embodiment of the invention.
Figure 16:
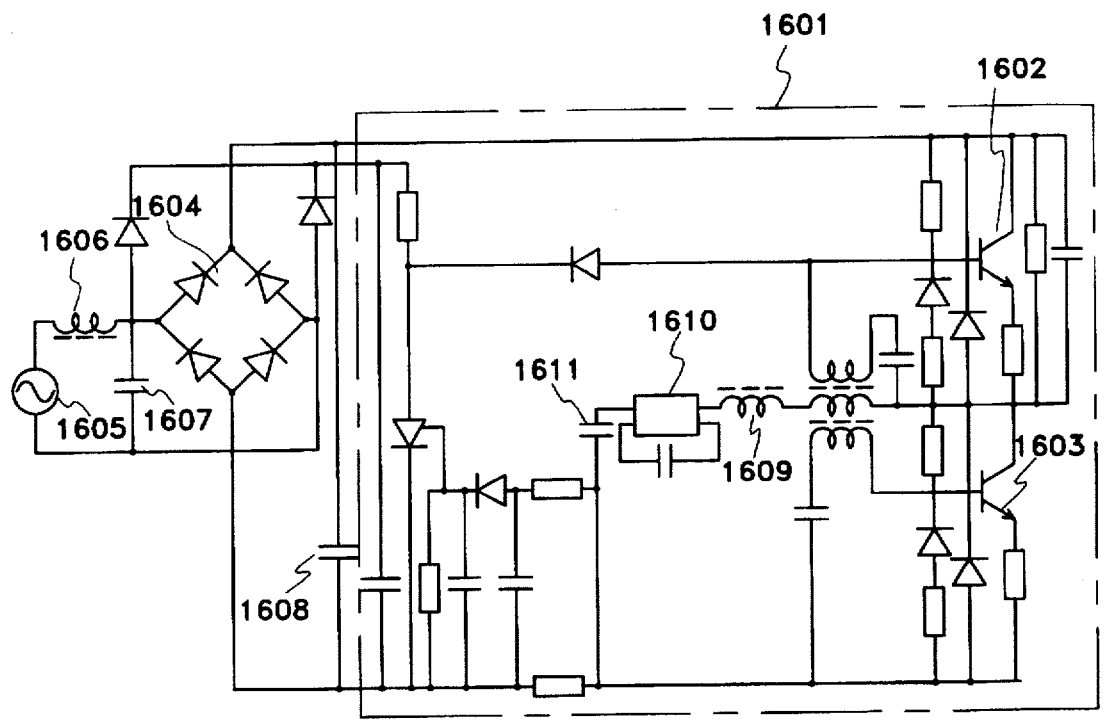
FIG. 16 (Prior Art) is a circuit diagram of a first known power supply apparatus.
Figure 17:
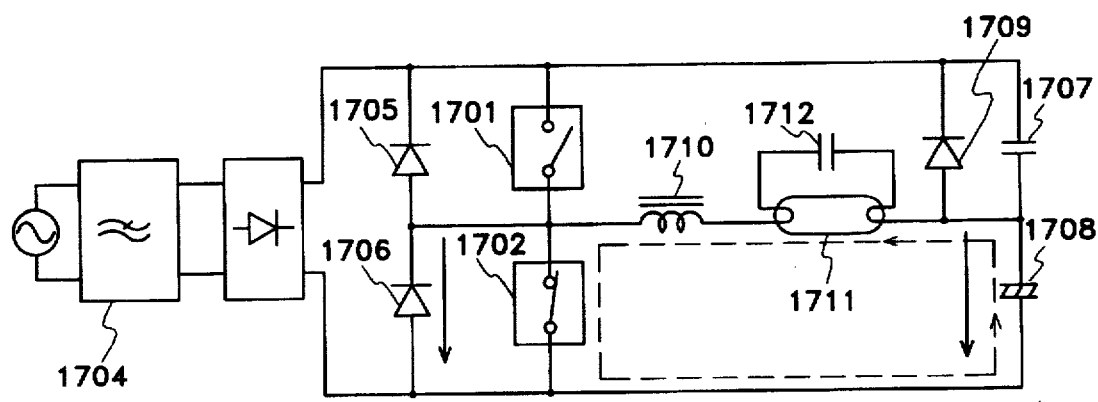
FIG. 17 (Prior Art) is a circuit diagram of a second known power supply apparatus.
Figure 18:
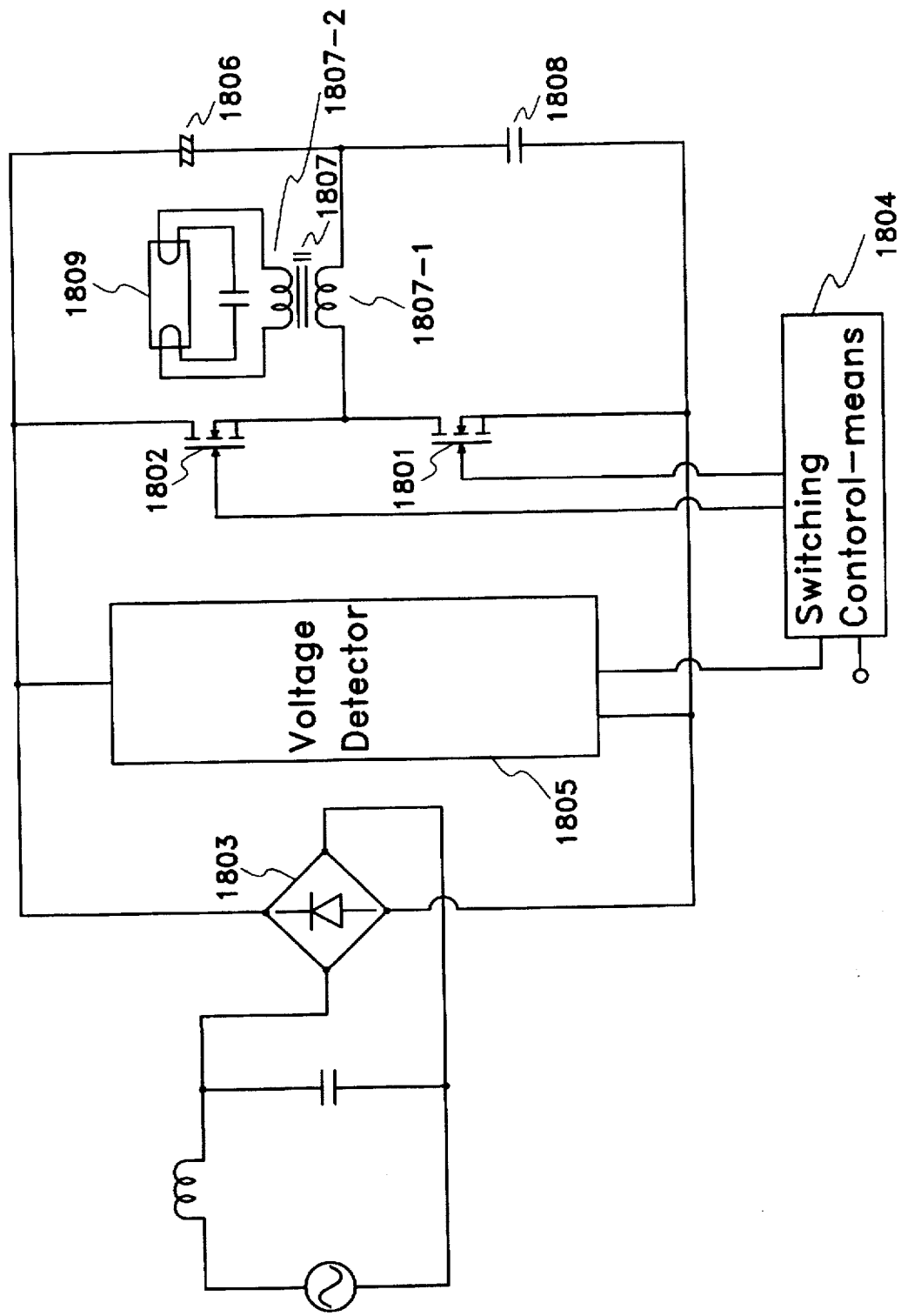
FIG. 18 is a circuit diagram of a third known prior power supply apparatus.
Figure 19A:
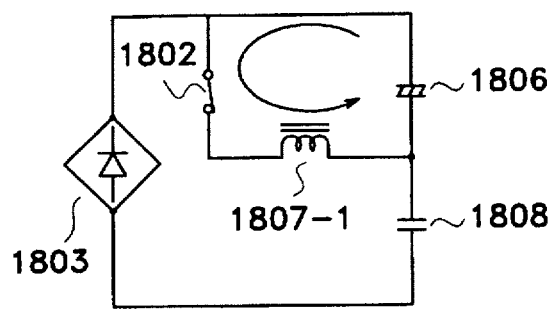
FIGS. 19(a), 19(b), 19(c), 19(d) and 19(e) are equivalent circuit diagrams explaining the operation of the apparatus shown in FIG. 18.
Figure 19B:
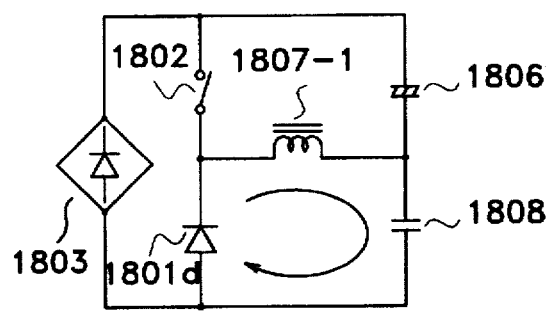
Figure 19C:
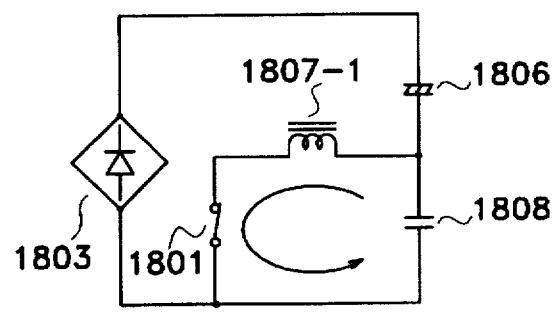
Figure 19D:
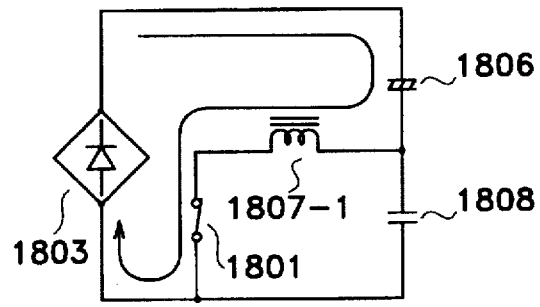
Figure 19E:
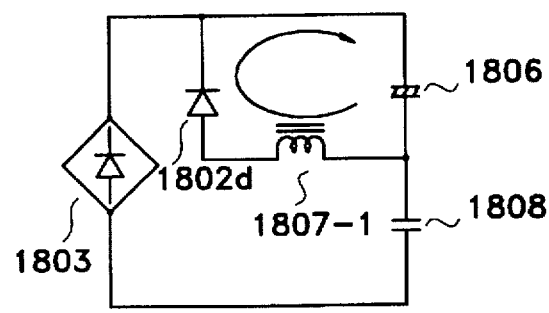

FIG. 15 is a perspective view of a lighting apparatus 1 having a power supply apparatus according to any of the embodiments of the invention. A luminaire 2 houses a lamp 123, which may be a fluorescent lamp, and power supply apparatus (not shown), which is employed as an enclosure and a reflector to reflect the light radiated from lamp 123.

While the invention has been described in connection with what are presently considered to be the most practical and preferred embodiments, it is to be understood that the invention is not limited to the disclosed embodiments. On the contrary, it is intended to cover various modifications and equivalent arrangements included within the spirit and scope of the appended claims.

What is claimed is:

1. A power supply apparatus comprising:

a rectifier for rectifying an AC power and outputting a non-smoothed DC power;

a switching circuit including first and second switching devices connected in series with each other, the switching devices alternately shutting off output of the rectifier at a high frequency;

a first capacitor coupled to the first switching device and the second switching device such that the first capacitor is supplied with a charging current through the first switching device from the rectifier when the first switching device is closed and discharges through the second switching device when the second switching device is closed for smoothing output of the rectifier;

a series resonance circuit including a second capacitor and an inductor provided in a path which flows charging and discharging currents of the first capacitor so that the voltage across the first capacitor becomes lower by the resonance voltage than that of the output of the rectifier;

a feedback circuit operatively coupled to the switching devices, the feedback circuit including a saturatable current transformer having a primary winding and secondary winding, the primary winding being provided at a path which at least flows the resonant current, the secondary winding being coupled to the switching devices for controlling the operation of the switching devices;

a control means for varying the saturation time of the saturatable current transformer; and an output means for outputting the voltage generated by the series resonance circuit.

2. A power supply apparatus according to claim 1, wherein the primary winding of saturatable current transformer is provided at a path which flows the resonant current, the charge and discharge current of the first capacitor.

3. A power supply apparatus according to claim 1, wherein the first and second capacitors are coupled to the second and first switching devices in parallel, respectively.

4. A power supply apparatus according to claim 1, wherein the second capacitor has a smaller capacitance than that of first capacitor.

5. A power supply apparatus according to claim 1, wherein the control means includes a variable impedance circuit coupled to the secondary winding of saturatable current transformer.

6. A power supply apparatus according to claim 1, wherein the control means includes a current supply supplying a variable direct exciting current to the saturatable current transformer.

7. A power supply apparatus comprising:

a rectifier for rectifying an AC power and outputting a non-smoothed DC power;

a switching circuit including first and second switching devices connected in series with each other, the switching devices alternately shutting off output of the rectifier at a high frequency;

a first capacitor coupled to the first switching device and the second switching device such that the first capacitor is supplied a charging current through the first switching device from the rectifier when the first switching device is closed and discharges through the second switching device when the second switching device is closed for smoothing output of the rectifier;

a series resonance circuit including a second capacitor and an inductor provided in a path which flows the charging and discharging currents of the first capacitor so that the voltage across the first capacitor becomes lower by the resonance voltage than that of the output of the rectifier;

a first feedback circuit operatively coupled to the first switching device, the first feedback circuit including a first saturatable current transformer having a primary winding and secondary winding, the primary winding being provided at a path which at least flows the resonant current, the secondary winding being coupled to the first switching device for controlling the operation of the first switching device;

a second feedback circuit operatively coupled to the second switching device, the second feedback circuit including a second saturatable current transformer having a primary winding and secondary winding, the primary winding being provided in a path which at least flows the resonant current, the secondary winding being coupled to the second switching device for controlling the operation of the second switching device;

a control means for at least varying the saturation time of the first saturatable current transformer; and an output means for outputting the voltage generated by the series resonance circuit.

8. A power supply apparatus according to claim 7, wherein each primary winding of first and second saturatable current transformers is provided in a path which flows the resonant current, the charging and discharging currents of the first capacitor.

9. A power supply apparatus according to claim 7, wherein the first and second capacitors are coupled to the second and first switching devices in parallel, respectively.

10. A power supply apparatus according to claim 7, wherein the second capacitor has a smaller capacitance than that of first capacitor.

11. A power supply apparatus according to claim 7, wherein the control means includes a variable impedance circuit coupled to the secondary winding of first saturatable current transformer.

12. A power supply apparatus according to claim 7, wherein the control means includes a current supply supplying a variable direct exciting current to the first saturatable current transformer.

13. A power supply apparatus comprising:

a rectifier for rectifying an AC power and outputting a non-smoothed DC power;

a switching circuit including first and second switching devices connected in series with each other, the switching devices alternately shutting off output of the rectifier at a high frequency;

a first capacitor coupled to the first switching device and the second switching device so that the first capacitor is supplied with a charging current through the first switching device from the rectifier when the first switching device closed and discharges through the second switching device when the second switching device is closed for smoothing output of the rectifier;

a series resonance circuit including a second capacitor and an inductor provided in a path which flows the charge and discharge current of the first capacitor so that the voltage across the first capacitor becomes lower by the resonance voltage than that of the output of the rectifier;

a feedback circuit operatively coupled to the switching devices, the feedback circuit including a saturatable current transformer having a primary winding and a pair of secondary windings, the primary winding being provided in a path which at least flows the resonant current, one of the secondary windings being coupled to the first switching device and the other secondary winding being coupled to the second switching device;

a control means for varying the saturation time of the saturatable current transformer; and an output means for outputting the voltage generated by the series resonance circuit.

14. A power supply apparatus according to claim 13, wherein the primary winding of saturatable current transformer is provided at a path which flows the resonant current, the charge and discharge current of the first capacitor.

15. A power supply apparatus according to claim 13, wherein the first and second capacitors are coupled to the second and first switching devices in parallel, respectively.

16. A power supply apparatus according to claim 13, wherein the second capacitor has a smaller capacitance than that of first capacitor.

17. A power supply apparatus according to claim 13, wherein the control means includes a variable impedance circuit coupled to one of the secondary windings which is corresponding to the first switching device.

18. A power supply apparatus according to claim 17, wherein the first and second switching devices are arranged at a lower and higher potential sides of the output of the rectifier, respectively.

19. A power supply apparatus according to claim 18, the control means further includes second variable impedance circuit coupled to the other secondary winding of the saturatable current transformer.

20. A power supply apparatus according to claim 13, wherein the control means includes a current supply supplying a variable direct exciting current to the saturatable current transformer.

21. A power supply apparatus comprising:

a rectifier for rectifying an AC power and outputting a non-smoothed DC power;

a switching circuit including first and second switching devices connected in series with each other so as to alternately shut off output of the rectifier at a high frequency, the first and second switching devices being arranged at lower and higher potential sides of the output of the rectifier, respectively;

a first capacitor coupled to the first switching device and the second switching device such that the first capacitor is supplied a charging current through the first switching device from the rectifier when the first switching device is closed and discharges through the second switching device when the second switching device is closed for smoothing output of the rectifier;

a series resonance circuit including a second capacitor and an inductor provided in a path which flows the charging and discharging currents of the first capacitor so that the voltage across the first capacitor becomes lower by the resonance voltage than that of the output of the rectifier;

a feedback circuit operatively coupled to the switching devices, the feedback circuit including a saturatable current transformer having a primary winding and a pair of secondary windings, the primary winding being provided in a path which at least flows the resonant current, one of the secondary windings being coupled to the first switching device and the other secondary winding being coupled to the second switching device;

a control means including first and second variable impedance circuits for varying the saturation time of the saturatable current transformer, the first variable impedance circuit being coupled to one secondary winding so as to flow current in one direction and the second variable impedance circuit being coupled to one of secondary windings so as to flow current in the opposite direction; and an output means for outputting the voltage generated by the series resonance circuit.

22. A power supply apparatus according to claim 21, wherein the primary winding of saturatable current transformer is provided at a path which flows the resonant current, the charge and discharge current of the first capacitor.

23. A power supply apparatus according to claim 21, wherein the first and second capacitors are coupled to the second and first switching devices in parallel, respectively.

24. A power supply apparatus according to claim 21, wherein the second capacitor has a smaller capacitance than that of first capacitor.

25. A lighting apparatus comprising:

a power supply comprising:

a rectifier for rectifying an AC power and outputting a non-smoothed DC power;

a switching circuit including first and second switching devices connected in series with each other, the switching devices alternately shutting off output of the rectifier at a high frequency;

a first capacitor coupled to the first switching device and the second switching device such that the first capacitor is supplied with a charging current through the first switching device from the rectifier when the first switching device is closed and discharges through the second switching device when the second switching device is closed for smoothing output of the rectifier;

a series resonance circuit including a second capacitor and an inductor provided in a path which flows charging and discharging currents of the first capacitor so that the voltage across the first capacitor becomes lower by the resonance voltage than that of the output of the rectifier;

a feedback circuit operatively coupled to the switching devices, the feedback circuit including a saturatable current transformer having a primary winding and secondary winding, the primary winding being provided in a path which flows the resonant current, the secondary winding being coupled to the switching devices for controlling their operation;

a control means for varying the saturation time of the saturatable current transformer; and an output means for outputting the voltage generated by the series resonance circuit; and a lamp connected with the output means of the power supply.

26. A lighting apparatus according to claim 25, further comprising a luminaire housing of the power supply and the lamp.

27. A lighting apparatus according to claim 26, wherein the primary winding of saturatable current transformer is provided at a path which flows the resonant current, the charge and discharge current of the first capacitor.

28. A lighting apparatus according to claim 26, wherein the first and second capacitors are coupled to the second and first switching devices in parallel, respectively.

29. A lighting apparatus according to claim 26, wherein the second capacitor has a smaller capacitance than that of first capacitor.

30. A lighting apparatus according to claim 26, wherein the control means includes a variable impedance circuit coupled to the secondary winding of saturatable current transformer.

31. A lighting apparatus according to claim 26, wherein the control means includes a current supply supplying a variable direct exciting current to the saturatable current transformer.

32. A lighting apparatus according to claim 25, wherein the lamp is a fluorescent lamp.

33. A lighting apparatus comprising:
a power supply apparatus comprising:
a rectifier for rectifying an AC power and outputting a non-smoothed DC power;
a switching circuit including first and second switching devices connected in series with each other, the switching devices alternately shutting off output of the rectifier at a high frequency;
a first capacitor coupled to the first switching device and the second switching device such that the first capacitor is supplied a charging current through the first switching device from the rectifier when the first switching device is closed and discharges through the second switching device when the second switching device is closed for smoothing output of the rectifier;
a series resonance circuit including a second capacitor and an inductor provided in a path which flows the charging and discharging currents of the first capacitor so that the voltage across the first capacitor becomes lower by the resonance voltage than that of the output of the rectifier;
a first feedback circuit operatively coupled to the first switching device, the first feedback circuit including a first saturatable current transformer having a primary winding and secondary winding, the primary winding being provided at a path which at least flows the resonant current, the secondary winding being coupled to the first switching device for controlling the operation of the first switching device;
a second feedback circuit operatively coupled to the second switching device, the second feedback circuit including a second saturatable current transformer having a primary winding and secondary winding, the primary winding being provided in a path which at least flows the resonant current, the secondary winding being coupled to the second switching device for controlling the operation of the second switching device;
a control means for at least varying the saturation time of the first saturatable current transformer; and
an output means for outputting the voltage generated by the series resonance circuit; and
a lamp connected with the output means of the power supply.

34. A lighting apparatus according to claim 33, further comprising a luminaire housing of the power supply and the lamp.

35. A lighting apparatus according to claim 34, wherein each the primary winding of first and second saturatable current transformers is provided at a path which flows the resonant current, the charge and discharge current of the first capacitor.

36. A lighting apparatus according to claim 34, wherein the first and second capacitors are coupled to the second and first switching devices in parallel, respectively.

37. A lighting apparatus according to claim 34, wherein the second capacitor has a smaller capacitance than that of first capacitor.

38. A lighting apparatus according to claim 34, wherein the control means includes a variable impedance circuit coupled to the secondary winding of first saturatable current transformer.

39. A power supply apparatus according to claim 34, wherein the control means includes a current supply supplying a variable direct exciting current to the first saturatable current transformer.

40. A lighting apparatus according to claim 33, wherein the lamp is a fluorescent lamp.

41. A lighting apparatus comprising:
a power supply comprising:
a rectifier for rectifying an AC power and outputting a non-smoothed DC power;
a switching circuit including first and second switching devices connected in series with each other, the switching devices alternately shutting off output of the rectifier at a high frequency;
a first capacitor coupled to the first switching device and the second switching device so that the first capacitor is supplied with a charging current through the first switching device from the rectifier when the first switching device is closed and discharges through the second switching device when the second switching device is closed for smoothing output of the rectifier;
a series resonance circuit including a second capacitor and an inductor provided in a path which flows the charge and discharge current of the first capacitor so that the voltage across the first capacitor becomes lower by the resonance voltage than that of the output of the rectifier;
a feedback circuit operatively coupled to the switching devices, the feedback circuit including a saturatable current transformer having a primary winding and a pair of secondary windings, the primary winding being provided in a path which at least flows the resonant current, one of the secondary windings being coupled to the first switching device and the other secondary winding being coupled to the second switching device;
a control means for varying the saturation time of the saturatable current transformer; and
an output means for outputting the voltage generated by the series resonance circuit; and
a lamp connected with the output means of the power supply.

42. A lighting apparatus according to claim 41, further comprising a luminaire housing of the power supply and the lamp.

43. A lighting apparatus according to claim 42, wherein the primary winding of saturatable current transformer is provided at a path which flows the resonant current, the charge and discharge current of the first capacitor.

44. A lighting apparatus according to claim 42, wherein the first and second capacitors are coupled to the second and first switching devices in parallel, respectively.

45. A lighting apparatus according to claim 42, wherein the second capacitor has a smaller capacitance than that of first capacitor.

46. A lighting apparatus according to claim 42, wherein the control means includes a variable impedance circuit coupled to one of the secondary windings which is corresponding to the first switching device.

47. A power lighting apparatus according to claim 46, wherein the first and second switching devices are arranged at a lower and higher potential sides of the output of the rectifier, respectively.

48. A lighting apparatus according to claim 47, the control means further includes second variable impedance circuit coupled to the other secondary winding of the saturatable current transformer.

49. A lighting apparatus according to claim 42, wherein the control means includes a current supply supplying a variable direct exciting current to the saturatable current transformer.

50. A lighting apparatus according to claim 41, wherein the lamp is a fluorescent lamp.

51. A lighting apparatus comprising:
a power supply comprising:
a rectifier for rectifying an AC power and outputting a non-smoothed DC power;
a switching circuit including first and second switching devices connected in series with each other so as to alternately shut off output of the rectifier at a high frequency, the first and second switching devices being arranged at a lower and higher potential sides of the output of the rectifier, respectively;
a first capacitor coupled to the first switching device and the second switching device such that the first capacitor is supplied a charging current through the first switching device from the rectifier when the first switching device is closed and discharges through the second switching device when the second switching device is closed for smoothing output of the rectifier;
a series resonance circuit including a second capacitor and an inductor provided in a path which flows the charging and discharging currents of the first capacitor so that the voltage across the first capacitor becomes lower by the resonance voltage than that of the output of the rectifier;
a feedback circuit operatively coupled to the switching devices, the feedback circuit including a saturatable current transformer having a primary winding and a pair of secondary windings, the primary winding being provided in a path which at least flows the resonant current, one of the secondary windings being coupled to the first switching device and the other secondary winding being coupled to the second switching device;
a control means including first and second variable impedance circuits for varying the saturation time of the saturatable current transformer, the first variable impedance circuit being coupled to one secondary winding so as to flow a current in one direction and the second variable impedance circuit being coupled the secondary winding so as to flow a current in the opposite direction; and
an output means for outputting the voltage generated by the series resonance circuit.; and
a lamp connected with the output means of the power supply.

52. A lighting apparatus according to claim 51 further comprising a luminaire housing of the power supply and the lamp.

53. A lighting apparatus according to claim 52, wherein the primary winding of saturatable current transformer is provided at a path which flows the resonant current, the charge and discharge current of the first capacitor.

54. A lighting apparatus according to claim 52, wherein the first and second capacitors are coupled to the second and first switching devices in parallel, respectively.

55. A lighting apparatus according to claim 52, wherein the second capacitor has a smaller capacitance than that of first capacitor.

56. A light apparatus according to claim 51, wherein the lamp is a fluorescent lamp.

* * * * *